United States Patent
Ozawa et al.

(10) Patent No.: US 6,836,383 B1
(45) Date of Patent: Dec. 28, 2004

(54) DIPHENYLSQUARYLIUM COMPOUND AND FILTER FOR DISPLAY CONTAINING THE SAME

(75) Inventors: Tetsuo Ozawa, Kanagawa (JP); Yukinari Haraguchi, Mie (JP); Tomomi Nakano, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/377,616

(22) Filed: Mar. 4, 2003

Related U.S. Application Data

(63) Continuation of application No. PCT/JP01/07565, filed on Aug. 31, 2001.

(30) Foreign Application Priority Data

| Sep. 4, 2000 | (JP) | .................................... | 2000-266415 |
| Apr. 3, 2001 | (JP) | .................................... | 2001-104146 |
| May 9, 2001 | (JP) | .................................... | 2001-138101 |

(51) Int. Cl.$^7$ ............................ C07C 13/00; G02B 5/20
(52) U.S. Cl. ........................... 359/885; 564/82; 564/92; 564/96; 564/99; 564/152; 564/155; 564/158
(58) Field of Search ............................ 564/80, 82, 92, 564/96, 99, 123, 152, 155, 158, 161, 192, 211, 221; 568/22; 359/885, 891; 313/582, 584; 430/7

(56) References Cited

U.S. PATENT DOCUMENTS

| 4,175,956 A | 11/1979 | Haley et al. | |
| 4,353,971 A | 10/1982 | Chang et al. | |
| 5,922,246 A | 7/1999 | Matsushita et al. | |
| 2002/0012182 A1 * | 1/2002 | Ozawa | ........................ 359/885 |
| 2002/0014819 A1 * | 2/2002 | Ozawa et al. | ................ 313/112 |

FOREIGN PATENT DOCUMENTS

| JP | 60-169453 | 9/1985 | |
| JP | 60-228448 | 11/1985 | |
| JP | 10-204304 | 8/1998 | |
| JP | 2000-043175 | 2/2000 | |
| JP | 2000-159776 A | * 6/2000 | |
| JP | 2000-345059 | 12/2000 | |

OTHER PUBLICATIONS

Dr. H. Quast, et al., Angew. Chem., vol. 77, No. 15, pp. 680–681, "Nucleophilic Carbenes From Heterocyclic N–Methylbetaines", 1965 (with partial English translation).
H.–E. Sprenger, et al., Angew. Chem. Internat. Edit., vol. 7, No. 7, pp. 530–535, "Cyclobutenediylium Dyes", 1968.
J. Griffiths, et al., Dyes and Pigments, vol. 44, pp. 9–17 "pH–Dependent Absorption and Fluorescence Spectra of Hydroxyaryl–Squarylium Dyes", 2000.
I. Shimizu, Senryo to Yakuhin, vol. 42, No. 9, pp. 10–20, "Synthesis of Asymmetric Sqarylium Dyes", 1997 (with English Abstract).

* cited by examiner

*Primary Examiner*—John A. McPherson
(74) *Attorney, Agent, or Firm*—Oblon, Spivak, McClelland, Maier & Neustadt, P.C.

(57) ABSTRACT

The object of the invention is to provide a diphenylsquarylium compound which has a sharp minimum value within the wavelength range of from 550 to 610 nm in the light transmittance curve and from which a filter causing no reduction of brightness of the visual field can be obtained when used by containing in a filter for display, and a filter for display which contains this diphenylsquarylium compound.

Constructions of the invention are a diphenylsquarylium compound represented by the following general formula (I) and a filter for display which contains this diphenylsquarylium compound.

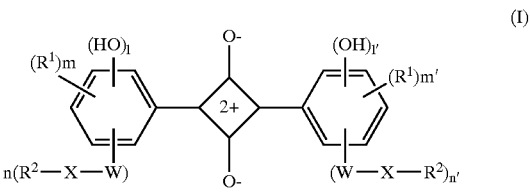

(I)

9 Claims, 2 Drawing Sheets

DIPHENYLSQUARYLIUM COMPOUND AND FILTER FOR DISPLAY CONTAINING THE SAME

TECHNICAL FIELD

This invention relates to a diphenylsquarylium compound and a filter for display containing the same, more particularly, it relates to a diphenylsquarylium compound which has a sharp absorption waveform having the minimum value within a wavelength range of from 550 to 610 nm in a light transmittance curve and is suitable for using it by containing in a filter for display, particularly in a filter for plasma display panel, and a filter for display containing the diphenylsquarylium compound.

BACKGROUND OF THE INVENTION

Up to now, various display devices effected by a cathode tube, a fluorescent character display tube, a field emission, a plasma panel, a liquid crystal, an electroluminescence and the like have been developed as color picture image display devices, and they employ a system in which clear color picture images are obtained by combining emissions of the three primary colors of red, blue and green and, at the same time, absorbing emissions of colors other than the three primary colors using so-called band-pass filters. In that case, those in which a pigment is contained are mainly used as the filters, and such a pigment is expected to have no absorption other than the absorption of interest and to show heat resistance, light resistance and the like.

For example, a plasma display panel which is used as a display device of various electronic instruments including a large wall-type television employs a system in which vacuum ultraviolet rays are radiated through excitation of a mixed gas of xenon and neon by their discharge, and the emission of three primary colors is obtained making use of the emission of respective fluorescent substances of red, blue and green by the vacuum ultraviolet rays, but it is known that the neon atom emits so-called neon orange light centering at around 590 nm when it returns to the ground state after excitation, so that there is a disadvantage in that a bright red color cannot easily be obtained due to mixing of the orange color with red color. Particularly regarding blocking of this orange color, since the red color-emitting moiety among the emission of three primary colors is adjacent to around 600 to 650 nm, it is necessary to block the orange light alone while not exerting influence on the red color emission. Contrary to this, with the aim of blocking this neon orange light, various examinations have been made on the use of a filter in which a pigment generally having absorbance at around 590 nm is contained, but the neon orange light cannot be efficiently blocked yet, there are problems such as reduction of brightness of the visual field, and heat resistance, light resistance and the like are also insufficient.

With the aim of solving these problems involved in the filter for plasma display panel, various studies have been conducted by the present inventors taking note of a squarylium compound, particularly a diphenylsquarylium compound, as the pigment to be contained in the filter. On the other hand, an example of the use of a diphenylsquarylium compound having hydroxyl group as a substituent has been disclosed, e.g., in JP-A-10-204304, but according to an examination made by the present inventors, it was revealed that blocking of the neon orange light is still insufficient, because the disclosed compound has the absorption in a range displaced from the wavelength range of the neon orange light. Also, JP-A-2000-43175 discloses an example of the use of a diphenylsquarylium compound having a substituted amino group as a substituent and illustratively describes compounds such as a compound having a dialkylamino group, or a dialkylamino group and acetamide group, or a dialkyl group and hydroxyl group, as the substituent of phenyl group, but according to an examination carried out by the present inventors, it was revealed that these compounds are also still insufficient in blocking the neon orange light.

DISCLOSURE OF THE INVENTION

The invention has been made taking the aforementioned current situation on filters for display into consideration, accordingly, the invention contemplates providing a diphenylsquarylium compound which has a sharp absorption waveform having the minimum value within a wavelength range of from 550 to 610 nm in a light transmittance curve and from which a filter having no reduction of brightness of the visual field can be obtained when it is used by containing in a filter for display, and a filter for display containing the diphenylsquarylium compound.

The gist of the invention resides in a diphenylsquarylium compound represented by the following general formula (I) and a filter for display which contains the diphenylsquarylium compound.

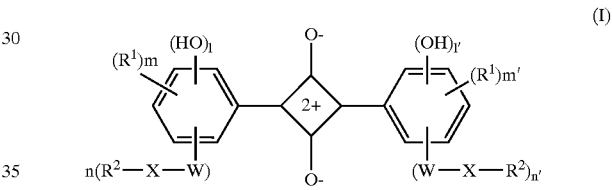

(I)

[In the formula (I), $R^1$ represents an alkyl group which may have substituent(s), an alkoxy group which may have substituent(s), a cycloalkyl group which may have substituent(s), an aryl group which may have substituent(s), an aryloxy group which may have substituent(s), or halogen atom, W in W—X—$R^2$ represents imino group, an alkylimino group or oxygen atom, X represents carbonyl group or sulfonyl group, $R^2$ represents monovalent group or hydrogen atom, l and l' are each independently an integer of from 0 to 4, m and m' are each independently an integer of from 0 to 4, n and n' are each independently an integer of from 1 to 5, wherein l+m+n≦5 and l'+m'+n'≦5, and when two or more of $R^1$ and W—X—$R^2$ are respectively present on the benzene rings, the respective $R^1$ and W—X—$R^2$ may be different from one another on one benzene ring or both benzene rings.]

BEST MODE FOR CARRYING OUT THE INVENTION

Figure 1:
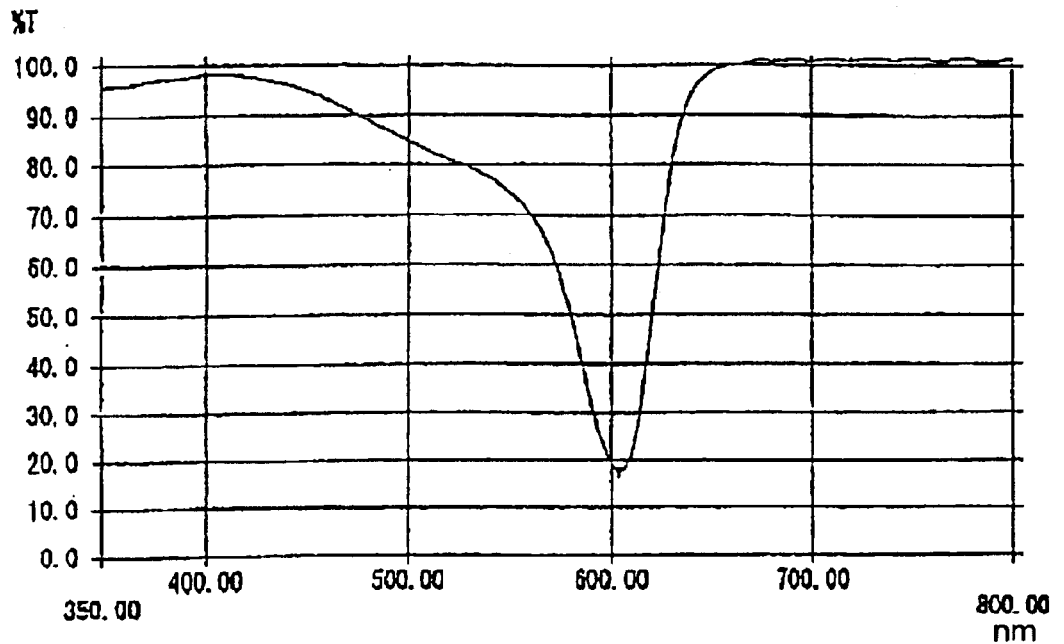
FIG. 1 is a light transmittance curve of the filter for plasma display panel use obtained in Example 4 of the invention.

The diphenylsquarylium compound of the invention is represented by the general formula (I), and examples of the alkyl group of $R^1$ in the general formula (I) include methyl group, ethyl group, propyl group, butyl group, pentyl group, hexyl group, heptyl group, octyl group, decyl group, undecyl group, dodecyl group, tridecyl group, pentadecyl group and the like straight chain or branched chain groups having from 1 to 20 carbon atoms, examples of the alkoxy group of $R^1$ include methoxy group, ethoxy group, propoxy group, butoxy group, pentyloxy group, hexyloxy group, heptyloxy group, octyloxy group, decyloxy group, undecyloxy group, dodecyloxy group, tridecyloxy group, pentadecyloxy group and the like straight chain or branched chain groups having from 1 to 20 carbon atoms, examples of the cycloalkyl group of $R^1$ include cyclopropyl group, cyclobutyl group, cyclopentyl group, cyclohexyl group, cycloheptyl group and the like groups having from 1 to 20 carbon atoms, examples of the aryl group of $R^1$ include phenyl group, naphthyl group and the like, examples of the aryloxy group of $R^1$ include phenoxy group, naphthyloxy group and the like, and examples of the halogen atom of $R^1$ include fluorine atom, chlorine atom, bromine atom and the like.

Also, examples of the substituents for the alkyl group, alkoxy group, cycloalkyl group, aryl group and aryloxy group include methyl group, ethyl group, propyl group, butyl group, pentyl group, hexyl group, heptyl group, octyl group, decyl group, and the like alkyl groups having from 1 to 10 carbon atoms, methoxy group, ethoxy group, propoxy group, butoxy group, pentyloxy group, hexyloxy group, heptyloxy group, octyloxy group, decyloxy group and the like alkoxy groups having from 1 to 10 carbon atoms, cyclopropyl group, cyclobutyl group, cyclopentyl group, cyclohexyl group, cycloheptyl group and the like cycloalkyl groups having from 1 to 10 carbon atoms, hydroxyl group, or fluorine atom, chlorine atom, bromine atom and the like halogen atoms.

As $R^1$ in the general formula (I), (1) a straight chain or branched chain alkyl group which may have an alkoxy group, hydroxy group or halogen atom as substituent(s), (2) a straight chain or branched chain alkoxy group which may have an alkoxy group as substituent(s), (3) an aryl group which may have an alkyl group, alkoxy group or halogen atom as substituent(s), (4) an aryloxy group which may have an alkyl group, alkoxy group or halogen atom as substituent(s) or (5) a halogen: atom is desirable, and a straight chain or branched chain alkyl group having from 1 to 8 carbon atoms or a straight chain or branched chain alkoxy group having from 1 to 8 carbon atoms is particularly desirable.

Also, as the alkyl group in the alkylimino group of W in W—X—$R^2$ of the general formula (I), a straight chain or branched chain group having from 1 to 8 carbon atoms is desirable, and as W, imino group or an alkylimino group is desirable and imino group is particularly desirable. Also, sulfonyl group is desirable as X in W—X—$R^2$. In this connection, $R^2$ is not hydrogen atom when X is sulfonyl group.

In addition, examples of the monovalent group of $R^2$ in W—X—$R^2$ include the same alkyl groups exemplified in the foregoing as the alkyl group of $R^1$, the same alkoxy groups exemplified in the foregoing as the alkoxy group of $R^1$, the same cycloalkyl groups exemplified in the foregoing as the cycloalkyl group of $R^1$, the same aryl groups-exemplified in the foregoing as the aryl group of $R^1$, the same aryloxy groups exemplified in the foregoing as the aryloxy group of $R^1$, amino group, and 3-pyridyl group, 2-furyl group, 2-tetrahydrofuryl group, 2-thienyl group and the like heterocyclic groups, and these alkyl group, alkoxy group, cycloalkyl group, aryl group, aryloxy group, amino group and heterocyclic group may have, e.g., an alkyl group having from 1 to 10 carbon atoms, an alkoxy group having from 1 to 10 carbon atoms, a cycloalkyl group having from 1 to 10 carbon atoms, a halogen atom, an aryl group and the like as the substituents, similar to those exemplified in the foregoing as the substituents of alkyl group, alkoxy group, cycloalkyl group, aryl group and aryloxy group in $R^1$.

As $R^2$ in the general formula (I), (1) a straight chain or branched chain alkyl group which may have an alkoxy group, cycloalkyl group, aryl group or halogen atom as substituent(s), (2) a straight chain or branched chain alkoxy group, (3) a cycloalkyl group which may have an alkyl group as substituent(s), (4) an aryl group which may have an alkyl group, alkoxy group or halogen atom as substituent(s), (5) an aryloxy group which may have an alkyl group, alkoxy group or halogen atom as substituent(s), (6) amino group which may have an alkyl group as substituent(s) or (7) a heterocyclic group is desirable, of which a straight chain or branched chain alkyl group having from 1 to 8 carbon atoms, a straight chain or branched chain alkoxy group having from 1 to 8 carbon atoms, cyclohexyl group, phenyl group, phenoxy group, amino group, 2-furyl group or 2-tetrahydrofuryl group is more desirable and a straight chain or branched chain alkyl group having from 1 to 8 carbon atoms is particularly desirable.

As the group represented by W—X—$R^2$ in the general formula (I), among those described in the foregoing, an alkylsulfonylamino group, a haloalkylsulfonylamino group, a phenylsulfonylamino group, an alkylphenylsulfonylamino group, an alkoxyphenylsulfonylamino group or a halophenylsulfonylamino group is particularly desirable.

In addition, in the general formula, l and l' are each independently an integer of from 0 to 4, m and m' are each independently an integer of from 0 to 4, n and n' are each independently an integer of from 1 to 5, wherein $l+m+n \leq 5$ and $l'+m'+n' \leq 5$, but it is desirable that l and l' is 1 or more, $l+m+n \leq 3$ and $l'+m'+n' \leq 3$, and more desirably m and m' are 0. Also, when two or more of $R^1$ and W—X—$R^2$ are respectively present on the benzene rings, the respective $R^1$ and W—X—$R^2$ may be different from one another on one benzene ring or both benzene rings. Alternatively, $R^1$ groups which are present adjoining each other on one benzene ring may be connected to each other to form a cyclic structure by becoming an alkanediyl group, alkylenedioxy group or the like.

Illustrative examples of the diphenylsquarylium compound of the invention described in the foregoing are shown below.

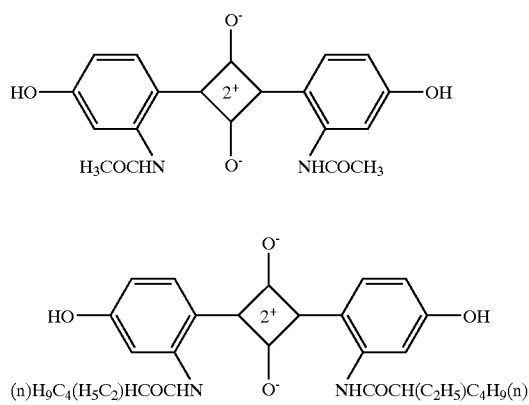
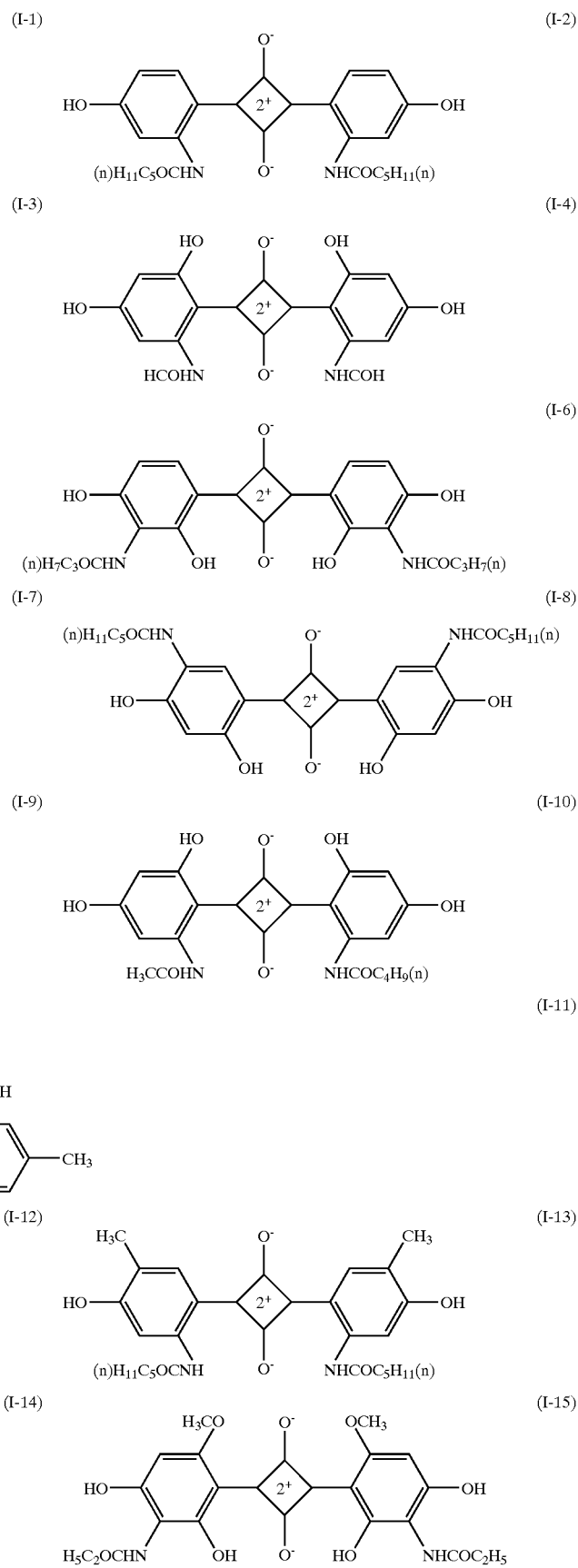

-continued
(I-16)
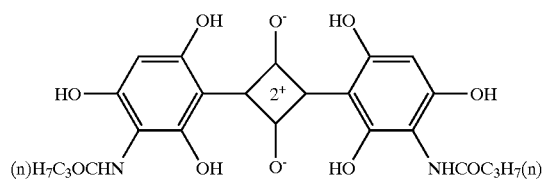
(I-17)
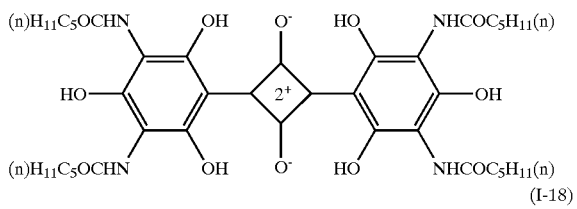
(I-18)
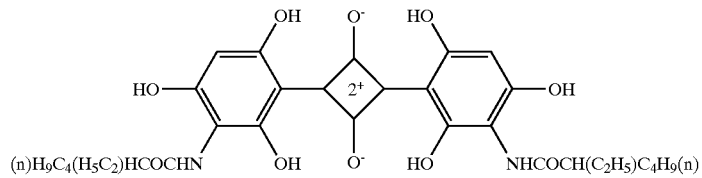
(I-19)
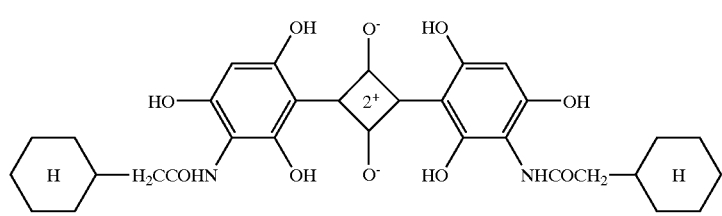
(I-20)
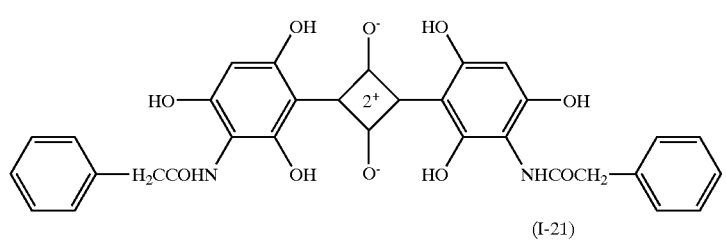
(I-21)
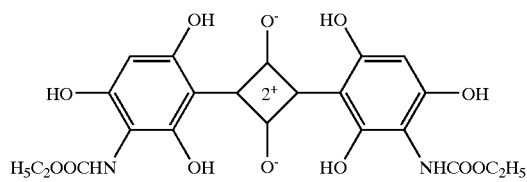
(I-22)
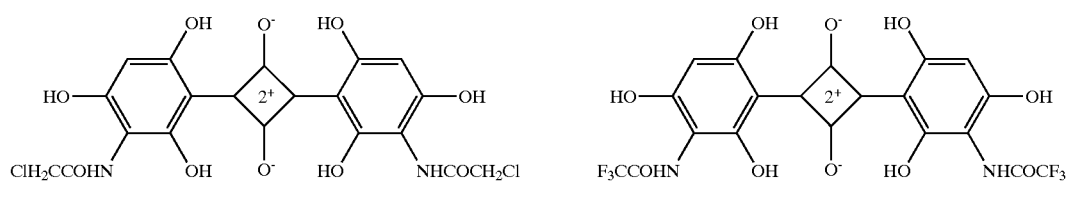
(I-23)
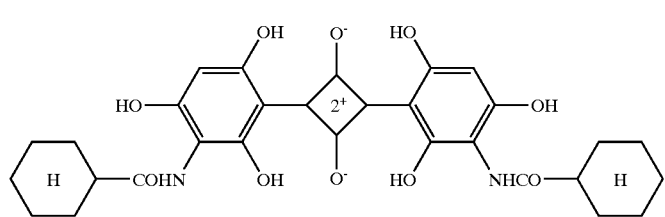
(I-24)
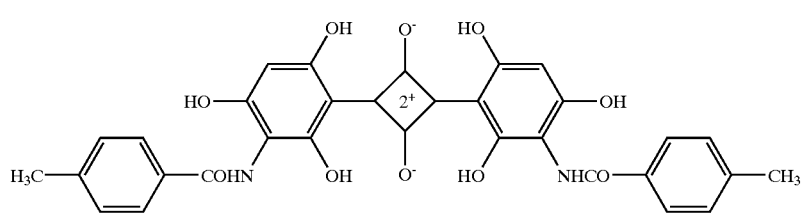
(I-25)

-continued
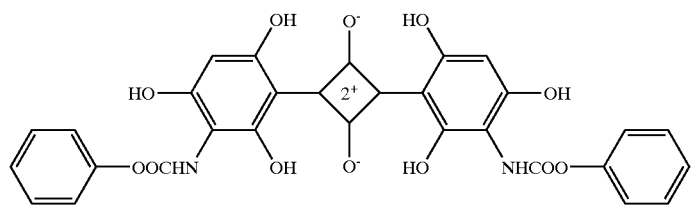 (I-26)
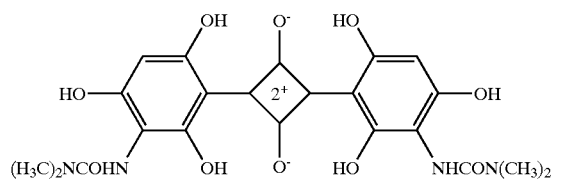 (I-27)
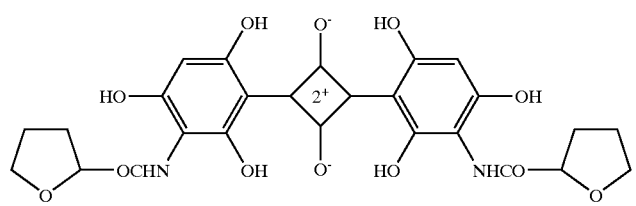 (I-28)
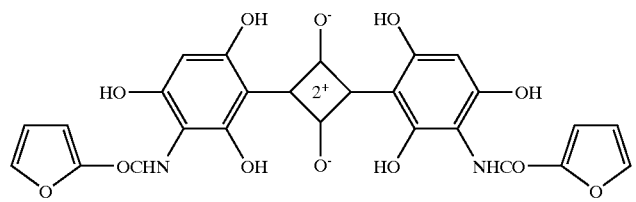 (I-29)
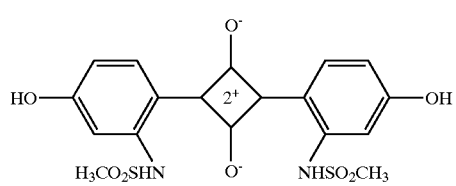 (I-30)
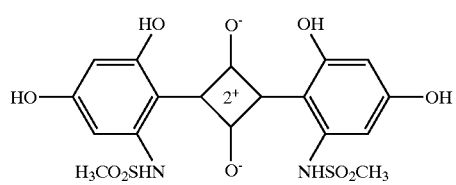 (I-31)
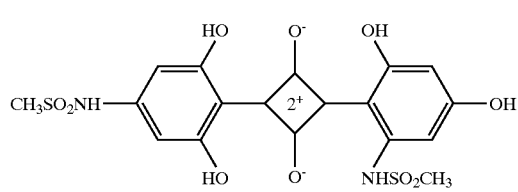 (I-32)
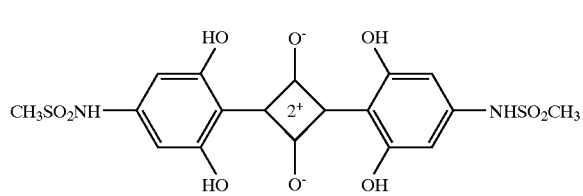 (I-33)

-continued
(I-34)
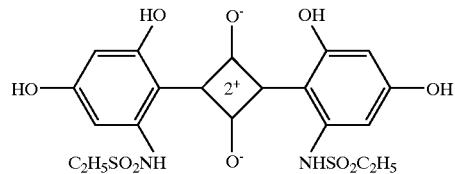
(I-35)
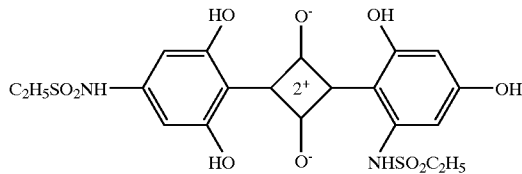
(I-36)
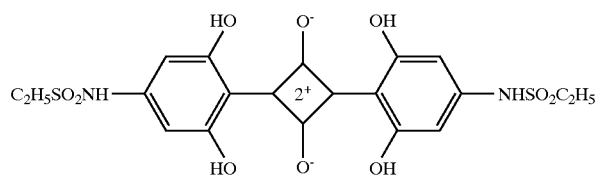
(I-37)
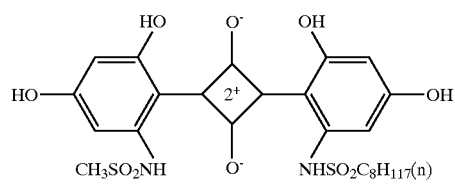
(I-38)
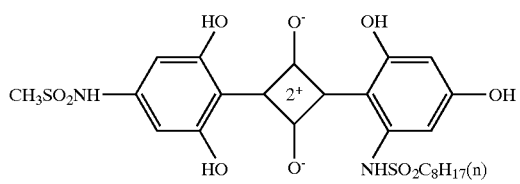
(I-39)
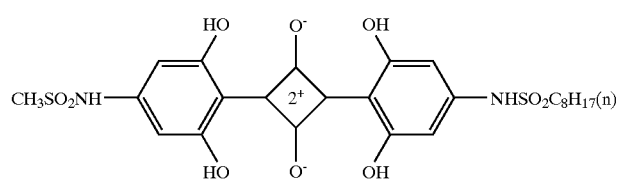
(I-40)
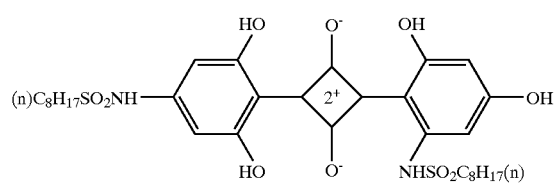
(I-41)
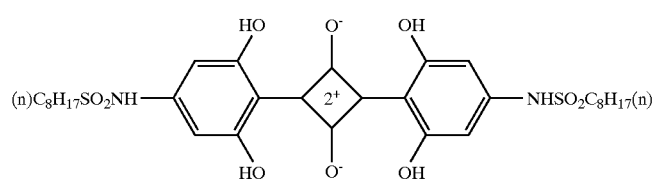
(I-42)
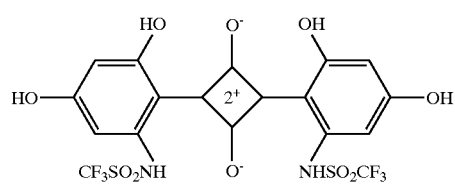
(I-43)
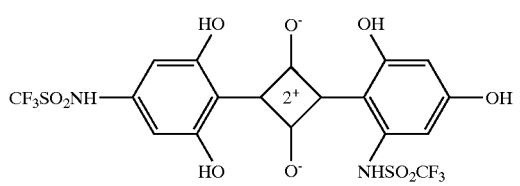
(I-44)
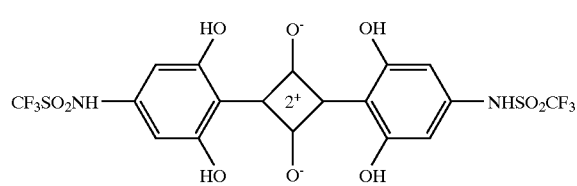

-continued
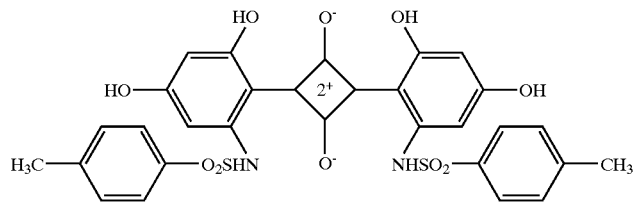
(I-45)
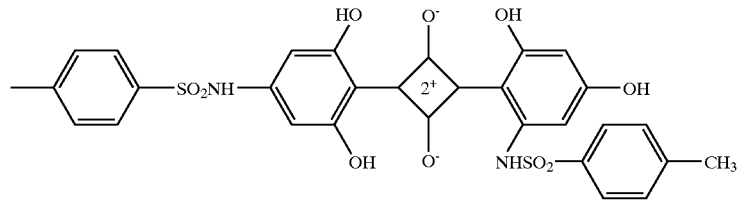
(I-46)
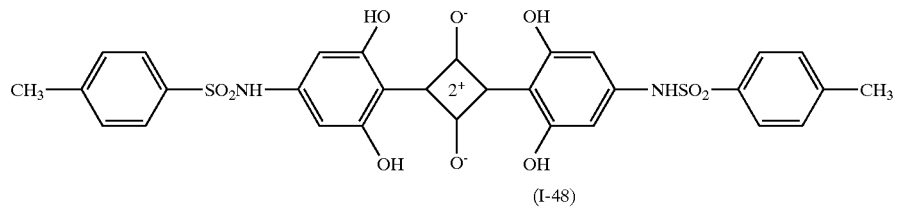
(I-47)
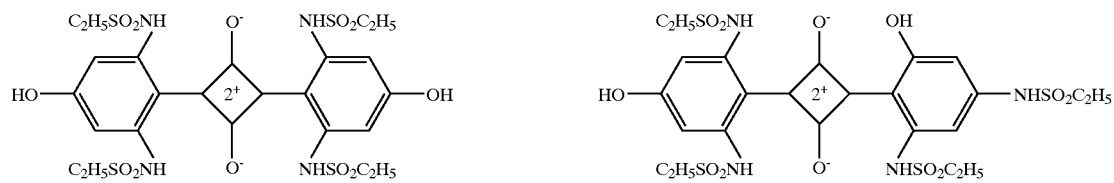
(I-48) (I-49)
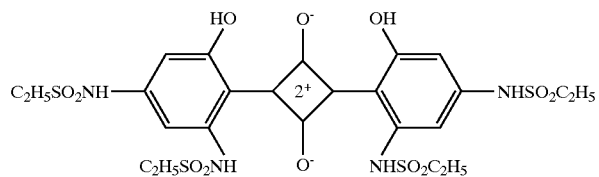
(I-50)
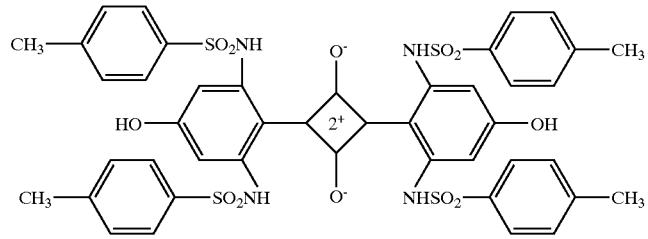
(I-51)
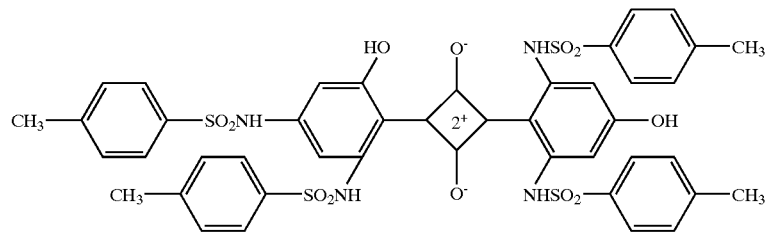
(I-52)

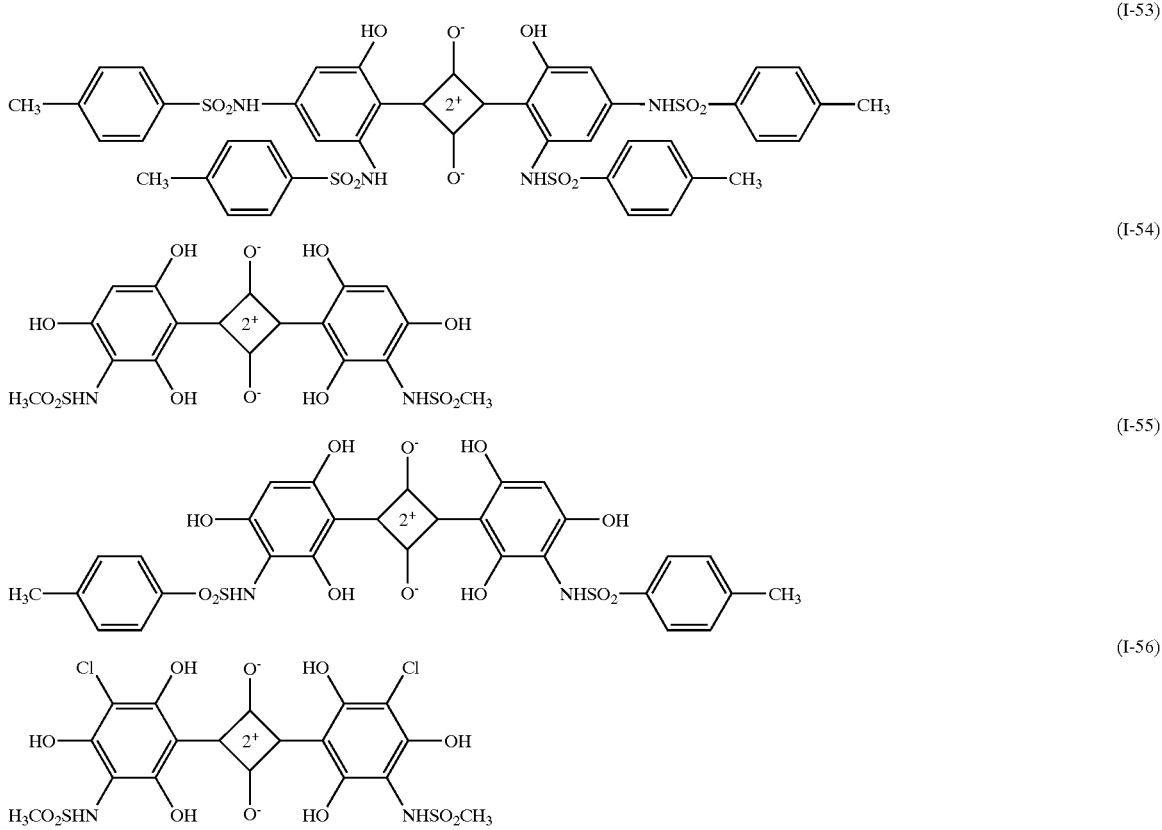

According to the invention, from viewpoints of the heat resistance, light resistance and the like, preferred among the above is a compound in which any group selected from the class consisting of hydroxyl group, $R^1$ and W—X—$R^2$ is bonded to at least both o-positions of the two phenyl groups of the general formula (I) and particularly preferred is a compound in which hydroxyl group or W—X—$R^2$ is bonded to both o-positions, and a bilaterally symmetric structure interposing the squarylium group is desirable.

In this connection, the diphenylsquarylium compound of the invention can be synthesized in accordance with the method described in Angew. Chem., vol. 77, 680–681 (1965), for example by allowing 1 mol of squaric acid (3,4-dihydroxy-3-cyclobutene-1,2-dione) to undergo dehydration condensation reaction with 2 mol of a substituted phenol compound which corresponds to the phenyl group having a substituent in the general formula (I), in ethanol, acetic acid or the like solvent or n-butyl alcohol/toluene, n-butyl alcohol/benzene or the like mixed solvent while heating at approximately from 70 to 150° C., or in combination with other known methods.

The diphenylsquarylium compound of the invention has a large molecular extinction coefficient, has the minimum value within a wavelength range of from 550 to 610 nm, preferably within a wavelength range of from 570 to 605 nm, particularly preferably within a wavelength range of from 580 to 600 nm, in the light transmittance curve, and also has a sharp valley type half-value width of 60 nm or less of said minimum value, so that it is useful as a blue color pigment.

In addition, the diphenylsquarylium compound of the invention has an excellent heat stability of 80% or more, preferably 90% or more, particularly preferably 95% or more, as its residual ratio when it is formed into a film shape by mixing with a binder resin or into a coat film by dissolving in a solvent and coating and drying on a base material and then allowed to stand for 100 hours in a constant temperature oven of 100° C., and also has an excellent light resistance of 70% or more, preferably 80% or more, as its residual ratio when it is exposed to a xenon lamp for 80 hours under conditions of an illumination intensity of 73,000 luxes, a black panel temperature of 63° C. and a relative humidity of 33%, by a xenon fade meter.

Accordingly, it can be used in, e.g., band-pass filters of various displays effected by a cathode tube, a fluorescent character display tube, a field emission, a plasma panel, a liquid crystal, an electroluminescence and the like, coloring agents for an ink jet ink, a thermosensible transfer recording material, a pressure sensitive recording material, an electrophotography, a color toner, a color filter, a solvatromic material, a color resin material and the like, charge generators for photo-recording medium (e.g., DVD-R), a photosensitizer, an electrophotography photosensitive material and the like, and functional pigments and the like as pigment probes for a solar cell, a pigment laser, a titration indicator and the like, and it is most useful as the filters for display, particularly as a filter for plasma display panel.

The filter for display of the invention comprises one or two or more species of the diphenylsquarylium compound contained therein, and examples of its containing mode include a laminate in which a diphenylsquarylium compound-containing resin layer comprising a binder resin containing the diphenylsquarylium compound is formed on a sheet-shape or film-shape transparent base material, and a single layer sheet or film of the diphenylsquarylium compound-containing resin layer comprising a binder resin containing the diphenylsquarylium compound. In this connection, when two or more species of the diphenylsquarylium compound are used, two or more species may be contained in each of the diphenylsquarylium compound-containing resin layer in the former case and the diphenylsquarylium compound-containing resin in the latter case, or layers each containing one species of two or more species may be formed. In that case, a laminate is formed even in the latter case. In addition, a delicate color control can be carried out by changing binder resins of respective layers in response to the diphenylsquarylium compound to be used.

In preparing the former laminate, various methods can be employed such as a method in which the diphenylsquarylium compound and a binder resin are dissolved or dispersed in an appropriate solvent, coated on a sheet-shaped or film-shaped transparent base material by a known coating method and then dried, a method in which the diphenylsquarylium compound and a binder resin are melt-kneaded and formed into a film or sheet by extrusion molding, injection molding, compression molding or the like in accordance with a conventional method for molding thermoplastic resins, and the film or sheet is adhered on a transparent base material using an adhesive or the like, a method in which the diphenylsquarylium compound and a binder resin are melt-kneaded and extrusion-laminated on a transparent base material by extruding in a film-shape or sheet-shape, and a method in which the diphenylsquarylium compound and a binder resin are melt-kneaded and subjected to co-extrusion molding together with a transparent resin base material, and in preparing a single layer sheet or film of the latter case a method in which the diphenylsquarylium compound and a binder resin are dissolved or dispersed in an appropriate solvent, spread on a carrier and then dried, a method in which the diphenylsquarylium compound and a binder resin are melt-kneaded and formed into a film or sheet by extrusion molding, injection molding, compression molding or the like in accordance with a conventional method for molding thermoplastic resins, and the like can be employed.

Among the above containing modes and preparation methods thereof, it is desirable that the filter for display of the invention is a laminate in which a diphenylsquarylium compound-containing resin layer comprising a binder resin containing the diphenylsquarylium compound is formed a transparent base material, by dissolving or dispersing the diphenylsquarylium compound and a binder resin in an appropriate solvent and spreading and drying the preparation on a sheet-shaped or film-shaped transparent base material by a known coating method.

According to the invention, the filter for display is prepared by a method in accordance with the layer constitution, layer material and the like for respective filter, and the method described in the following is suitable for the filter for plasma display panel which is particularly desirable in the invention.

The sheet-shaped or film-shaped transparent base material which constitutes the filter for display of the invention is not particularly limited, with the proviso that it is a material which is substantially transparent and has small absorption and scattering. Its illustrative examples include glass, a polyolefin resin, an amorphous polyolefin resin, a polyester resin, a polycarbonate resin, an acryl resin, a polystyrene resin, a polyvinyl chloride resin, a polyvinyl acetate resin, a polyallylate resin, a polyether sulfone resin and the like, of which an amorphous polyolefin resin, a polyester resin, a polycarbonate resin, an acryl resin, a polyallylate resin, a polyether sulfone resin and the like are desirable.

The aforementioned resin is formed into a film shape or sheet shape using, e.g., injection molding, T-die molding, calender molding, compression molding or the like conventional method or a method for casting it by melting in an organic solvent, and the resin can be blended with generally known additives, heat resistant antioxidants, lubricants, antistatic agents and the like.

Regarding its thickness, a range of from 10 $\mu$m to 5 mm is generally desirable. The base material which constitutes such a transparent base plate may be unstretched or stretched. Also, it may be laminated with other base material.

In addition, said transparent base material may be subjected to a surface treatment by corona discharge treatment, flame treatment, plasma treatment, glow discharge treatment, surface-roughening treatment, drug treatment or the like conventionally known method, or to a coating with an anchor coat agent, primer or the like.

Also, the binder resin is not particularly limited with the proviso that it is a material which is substantially transparent and has small absorption and scattering of light, and its examples include an acryl resin, an ethylene-vinyl acetate copolymer resin and its saponification product, a polystyrene resin, a polyester resin, a polycarbonate resin, a polyamide resin, a polysulfone resin, a polyvinyl acetate resin, a polyvinyl butyral resin, a cellulose resin, a phenol resin, a phenoxy resin and the like, of which polyester resins, acryl resins and polycarbonate resins are preferred from the viewpoint of easy obtainment, and acryl resins are particularly preferred in view of the adjustment of absorption wavelength.

Using amount of the binder is generally from 20 to 5,000 times by weight, preferably from 40 to 2,000 times by weight, based on a compound having the maximum absorption within the wavelength range of from 550 to 610 nm.

Also, examples of the solvent include butane, pentane, hexane, heptane, octane and the like alkanes; cyclopentane, cyclohexane, cycloheptane, cyclooctane and the like cycloalkanes; ethanol, propanol, butanol, amyl alcohol, hexanol, heptanol, octanol, decanol, undecanol, diacetone alcohol, furfuryl alcohol and the like alcohols; methyl cellosolve, ethyl cellosolve, butyl cellosolve, methyl cellosolve acetate, ethyl cellosolve acetate and the like cellosolves; propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether and the like propylene glycols; acetone, methyl amyl ketone, cyclohexanone, acetophenone and the like ketones; dioxane, tetrahydrofuran and the like ethers; butyl acetate, amyl acetate, ethyl butyrate, butyl butyrate, diethyl oxalate, ethyl pyruvate, ethyl-2-hydroxybutyrate, ethyl acetoacetate, methyl lactate, ethyl lactate, methyl 3-methoxypropionate and the like esters; chloroform, methylene chloride, tetrachloroethane and the like halogenated hydrocarbons; benzene, toluene, xylene, cresol and the like aromatic hydrocarbons; and dimethylformamide, dimethylacetamide, N-methylpyrrolidone and the like high polar solvents.

In this connection, a dispersing agent such as a polyvinyl butyral resin, a phenoxy resin, a rosin-modified phenol resin or the like phenol resin, a petroleum resin, a hydrogenated rosin, a rosin ester, a maleic rosin or the like rosin resin, a polyurethane resin or the like may be used in the solution or dispersion of the diphenylsquarylium compound and binder resin.

Regarding using amount of the dispersing agent, it is added generally in an amount of approximately from 0.01 to 10 parts by weight based on 100 parts by weight of the diphenylsquarylium pigment to be used.

Also, concentration of the diphenylsquarylium compound in the solution or dispersion of the diphenylsquarylium compound and binder resin, and also the dispersing agent which is used as occasion demands, is generally from 0.5 to 50% by weight, and ratio of the diphenylsquarylium compound occupying total amount of the diphenylsquarylium compound, binder resin and dispersing agent is generally from 0.05 to 50% by weight, preferably from 0.1 to 20% by weight.

Also, examples of the coating method of the solution or dispersion on the transparent base material include dip coating, flow coating, spray coating, bar coating, gravure coating, roll coating, blade coating, air knife coating and the like, and the coating amount is within the range of generally from 0.1 to 30 μm, preferably from 0.5 to 10 μm, as dry film thickness.

In addition, it is essential that the filter for display of the invention contains the diphenylsquarylium compound, and in order to control color tone and improve color purity, or to improve color temperature and the like, it is desirable that a band-pass filter, particularly a filter for plasma display panel, further contains a dipyrazolylmethine compound represented by the following general formula (II) or/and a dipyrazolylsquarylium compound represented by the following general formula (III).

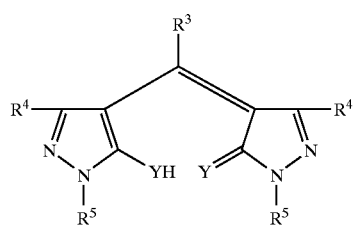

(II)

[In the formula (II), $R^3$ represents an alkyl group which may have substituent(s), a cycloalkyl group which may have substituent(s), an aryl group which may have substituent (s), or hydrogen atom, $R^4$ represents an alkyl group which may have substituent(s), an alkoxy group which may have substituent(s), an alkoxycarbonyl group which may have substituent(s), a cycloalkyl group which may have substituent(s), an aryl group which may have substituent(s), an aryloxy group which may have substituent(s), an aryloxycarbonyl group which may have substituent(s), amino group which may have substituent(s), or hydrogen atom, $R^5$ represents an alkyl group which may have substituent(s), a cycloalkyl group which may have substituent(s), an aryl group which may have substituent(s), or hydrogen atom and Y represents oxygen atom or imino group, wherein these $R^4$, $R^5$ and Y may be different from one another between both pyrazole rings.]

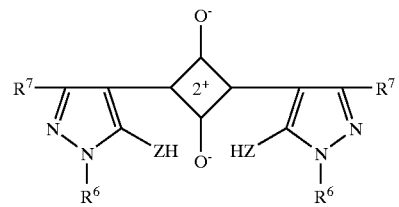

(III)

[In the formula (III), $R^6$ represents an alkyl group which may have substituent(s), a cycloalkyl group which may have substituent(s), an aryl group which may have substituent(s), or hydrogen atom, $R^7$ represents an alkyl group which may have substituent(s), an alkoxy group which may have substituent(s), an alkoxycarbonyl group which may have substituent(s), a cycloalkyl group which may have substituent(s), an aryl group which may have substituent(s), an aryloxy group which may have substituent(s), an aryloxycarbonyl group which may have substituent(s), amino group which may have substituent(s), or hydrogen atom and Z represents oxygen atom or imino group, wherein these $R^6$, $R^7$ and Z may be different from one another between both pyrazole rings.]

In this case, examples of the alkyl group of $R^3$ and $R^5$ in the general formula (II) include methyl group, ethyl group, propyl group, butyl group, pentyl group, hexyl group, heptyl group, octyl group, decyl group, undecyl group, dodecyl group, tridecyl group, pentadecyl group and the like straight chain or branched chain groups having from 1 to 20 carbon atoms, examples of the cycloalkyl group of $R^3$ and $R^5$ include cyclopropyl group, cyclobutyl group, cyclopentyl group, cyclohexyl group, cycloheptyl group and the like groups having from 1 to 20 carbon atoms, and examples of the aryl group of $R^3$ and $R^5$ include phenyl group, naphthyl group and the like.

Also, examples of the substituents of the alkyl group, cycloalkyl group and aryl group include methyl group, ethyl group, propyl group, butyl group, pentyl group, hexyl group, heptyl group, octyl group, decyl group and the like alkyl groups having from 1 to 10 carbon atoms, methoxy group, ethoxy group, propoxy group, butoxy group, pentyloxy group, hexyloxy group, heptyloxy group, octyloxy group, decyloxy group and the like alkoxy groups having from 1 to 10 carbon atoms, phenyl group, naphthyl group and the like aryl groups, phenoxy group, naphthyloxy group and the like aryloxy groups, sulfonamide group, an alkyl sulfonamide group, a dialkyl sulfonamide group, nitro group, hydroxyl group, and fluorine atom, chlorine atom, bromine atom and the like halogen atoms.

As $R^3$ and $R^5$ in the general formula (II), (1) a straight chain or branched chain alkyl group which may have an alkoxy group, aryl group, aryloxy group, hydroxy group or halogen atom as substituent(s), (2) an aryl group which may have an alkyl group, alkoxy group, sulfonamide group, alkyl sulfonamide group, dialkyl sulfonamide group, nitro group, hydroxy group or halogen atom as substituent(s), (3) hydrogen atom is desirable, and particularly, hydrogen atom, a straight chain or branched chain alkyl group having from 1 to 8 carbon atoms or phenyl group is desirable as $R^3$, and a straight chain or branched chain alkyl group having from 1 to 8 carbon atoms or phenyl group which may have an alkyl group or halogen atom as substituent(s) is desirable as $R^5$.

The same groups exemplified in the foregoing as the alkyl group of $R^3$ and $R^5$ can be cited as $R^4$ in the general formula (II), methoxy group, ethoxy group, propoxy group, butoxy group, pentyloxy group, hexyloxy group, heptyloxy group, octyloxy group, decyloxy group, undecyloxy group, dodecyloxy group, tridecyloxy, pentadecyloxy and the like straight chain or branched chain groups having from 1 to 20 carbon atoms can be cited as the alkoxy group of $R^4$, and carbonyl group having the alkoxy group as the alkoxy group of $R^4$, the same groups exemplified in the foregoing as the cycloalkyl group of $R^3$ and $R^5$ as the cycloalkyl group of $R^4$, the same groups exemplified in the foregoing as the aryl group of $R^3$ and $R^5$ as the aryl group, phenoxy group, naphthyloxy group and the like as the aryloxy group of $R^4$, and carbonyl group having the aryloxy group as the aryloxycarbonyl group of $R^4$, respectively.

In addition, examples of the substituents of the alkyl group, alkoxy group, alkoxycarbonyl group, cycloalkyl group, aryl group, aryloxy group, aryloxycarbonyl group and amino group include the same alkyl groups exemplified in the foregoing as the substituents of the alkyl group, cycloalkyl group and aryl group in $R^3$ and $R^5$, the alkoxy groups in the same manner, the aryl groups in the same manner, the aryloxy groups in the same manner, the sulfonamide group in the same manner, the alkyl sulfonamide groups in the same manner, the dialkyl sulfonamide groups in the same manner, the nitro group in the same manner, the halogen atoms in the same manner, and propionyl group, butyryl group, benzoyl group and the like acyl groups, methanesulfonyl group, benzenesulfonyl group and the like sulfonyl groups, hydroxyl group, halogen atoms and the like.

As $R^4$ in the general formula (II), among those described in the foregoing, (1) a straight chain or branched chain alkyl group which may have an alkoxy group, aryl group, aryloxy group, hydroxy group or halogen atom as substituent(s), (2) a straight chain or branched chain alkoxy group which may have an alkoxy group as substituent(s), (3) carbonyl group having an alkoxy group which may have an alkoxy group as substituent(s), (4) an aryl group which may have an alkyl group, alkoxy group, sulfonamide group, alkyl sulfonamide group, dialkyl sulfonamide group, nitro group, hydroxyl group or halogen atom as substituent(s), (5) carbonyl group having an aryl group which may have an alkyl group or alkoxy group as substituent(s) or (6) amino group which may have an alkyl group, acyl group or sulfonyl group as substituent(s) is desirable, and a straight chain or branched chain alkyl group having from 1 to 8 carbon atoms is particularly desirable.

Also, oxygen atom is desirable as Y in the general formula (II). In addition, regarding the dipyrazolylmethine compound according to the invention represented by the general formula (II), $R^4$, $R^5$ and Y may be different from one another between both pyrazole rings, but a bilaterally symmetric structure interposing the methine group is desirable, and illustrative examples of suitable dipyrazolylmethine compounds are shown below.

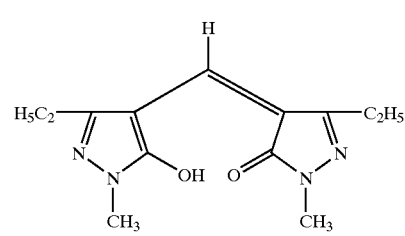

(II-1)

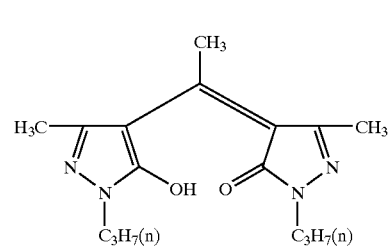

(II-2)

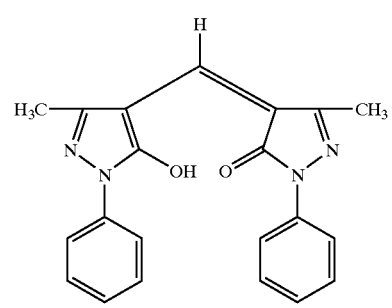

(II-3)

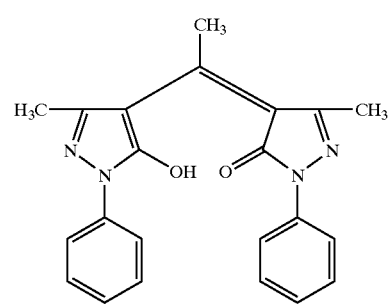

(II-4)

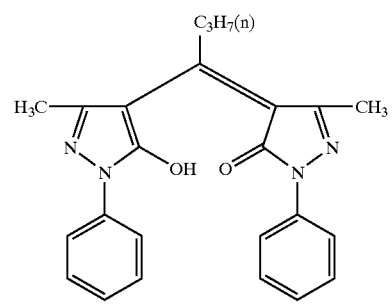

(II-5)

-continued

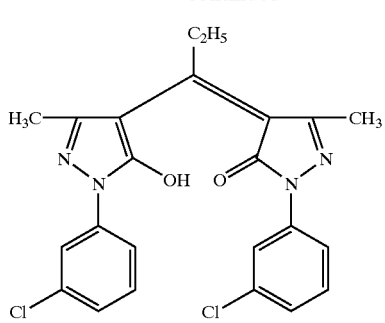
(II-6)

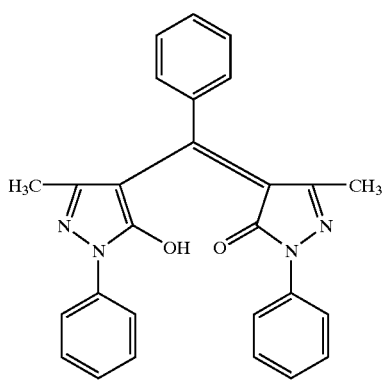
(II-7)

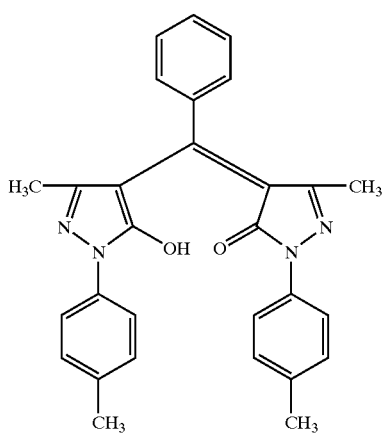
(II-8)

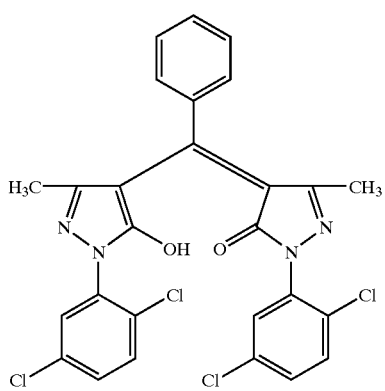
(II-9)

In this connection, the dipyrazolylmethine compound can be synthesized in accordance with the method described in Liebigs *Ann. Chem.*, 1680–1688 (1976), e.g., by allowing 1 mol of an orthoformic acid alkyl ester compound to undergo condensation reaction with 2 mol of a pyrazolone compound corresponding to the general formula (II) by heating under reflux without solvent, or by carrying out the above reaction in N-methylpyrrolidone, N,N-dimethylformamide, dimethyl sulfoxide, 1,3-dimethyl-2-imidazolidinone or the like solvent while heating at about 90 to 200° C. or in combination with other known method.

The same groups exemplified as the alkyl group, cycloalkyl group and aryl group of $R^3$ and $R^5$ of the general formula (II) can be cited as the alkyl group, cycloalkyl group and aryl group of $R^6$ of the general formula (III).

In addition, examples of the substituents of the alkyl group, cycloalkyl group and aryl group include the same groups exemplified as the substituents of the alkyl group, cycloalkyl group and aryl group of $R^3$ and $R^5$ of the general formula (II), such as an alkyl group, an alkoxy group, an aryl group, an aryloxy group, sulfonamide group, an alkyl sulfonamide group, a dialkyl sulfonamide group, nitro group, hydroxyl group, a halogen atom and the like.

As $R^6$ in the general formula (III), among those described in the foregoing, (1) a straight chain or branched chain alkyl group which may have an alkoxy group, aryl group, aryloxy group, hydroxy group or halogen atom as substituent(s), or (2) an aryl group which may have an alkyl group, alkoxy group, sulfonamide group, alkyl sulfonamide group, dialkyl sulfonamide group, nitro group, hydroxy group or halogen atom as substituent(s) is desirable, and a straight chain or branched chain alkyl group having from 1 to 8 carbon atoms which may have an alkoxy group as substituent(s) is particularly desirable.

Also, the same groups exemplified as the alkyl group, alkoxy group, alkoxycarbonyl group, cycloalkyl, aryl group, aryloxy group and aryloxycarbonyl group of $R^4$ of the general formula (II) can be cited as the alkyl group, alkoxy group, alkoxycarbonyl group, cycloalkyl group, aryl group, aryloxy group and aryloxycarbonyl group of $R^7$ of the general formula (III).

In addition, examples of the substituents of the alkyl group, alkoxy group, alkoxycarbonyl group, cycloalkyl group, aryl group, aryloxy group, aryloxycarbonyl group and amino group include the same groups exemplified as the substituents of the alkyl group, alkoxy group, alkoxycarbonyl group, cycloalkyl group, aryl group, aryloxy group, aryloxycarbonyl group and amino group of $R^4$ of the general formula (II), such as an alkyl group, an alkoxy group, an aryl group, an aryloxy group, sulfonamide group, an alkyl sulfonamide group, a dialkyl sulfonamide group, nitro group, an acyl group, sulfonyl group, hydroxyl group, a halogen atom and the like.

As $R^7$ in the general formula (III), among those described in the foregoing, (1) a straight chain or branched chain alkyl group which may have an alkoxy group, aryl group, aryloxy group, hydroxy group or halogen atom as substituent(s), (2) a straight chain or branched chain alkoxy group which may have an alkoxy group as substituent(s), (3) carbonyl group having an alkoxy group which may have an alkoxy group as substituent(s), (4) an aryl group which may have an alkyl group, alkoxy group, sulfonamide group, alkyl sulfonamide group, dialkyl sulfonamide group, nitro group, hydroxyl group or halogen atom as substituent(s), (5) carbonyl group having an aryl group which may have an alkyl group or alkoxy group as substituent(s) or (6) amino group which may have an alkyl group, acyl group or sulfonyl group as substituent(s) is desirable, and a straight chain or branched chain alkyl group having from 1 to 8 carbon atoms which may have an alkoxy group as substituent(s) is particularly desirable.

Also, oxygen atom is desirable as Z in the general formula (III). In addition, in the dipyrazolylsquarylium compound represented by the general formula (III) according to the invention, $R^6$, $R^7$ and Z may be different from one another between both pyrazole rings, but a bilaterally symmetric structure interposing the squarylium group is desirable, and illustrative examples of suitable dipyrazolylsquarylium compounds are shown below.

(III-1)

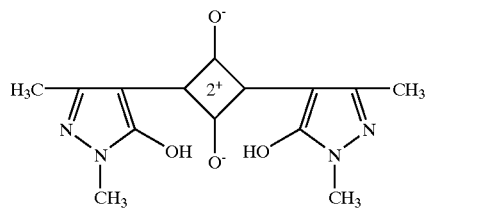

(III-2)

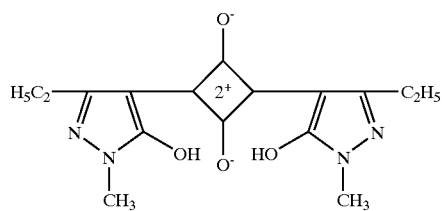

(III-3)

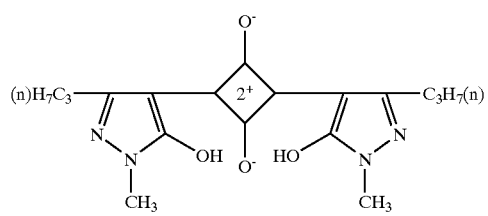

(III-4)

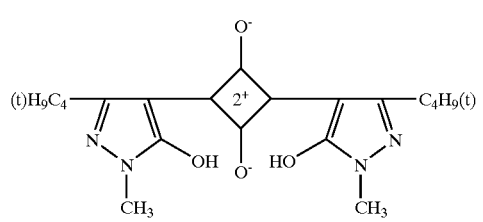

(III-5)

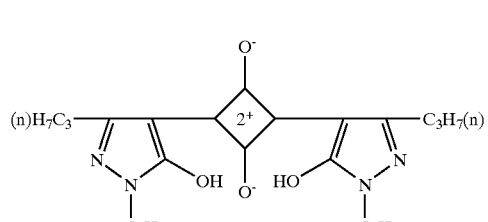

(III-6)

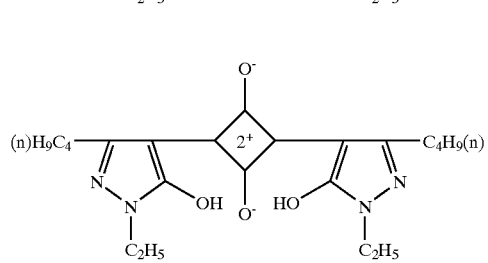

(III-7)

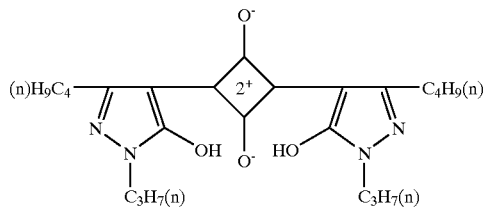

(III-8)

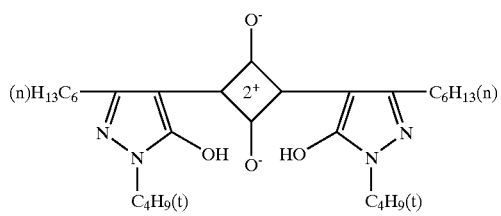

In this connection, the dipyrazolylsquarylium compound can be synthesized in accordance with the method described in *Angew. Chem.*, vol. 77, 680–681 (1965) in the same manner as the case of the diphenylsquarylium compound, for example using a pyrazolone compound and squaric acid, or in combination with other known method.

In addition, amounts of the dipyrazolylmethine compound and dipyrazolylsquarylium compound to be contained are generally from 0.01 to 20 parts by weight, preferably from 0.05 to 10 parts by weight, as the total amount of both compounds, based on 100 parts by weight of the total amount of the binder resin, dispersing agent and diphenylsquarylium compound. In that case, when amount of the diphenylsquarylium compound is defined as 1, approximately from 0.2 to 1 of the dipyrazolylmethine compound and approximately from 0.1 to 1.5 of the dipyrazolylsquarylium compound are used. In general, a filter becomes greenish when amount of the dipyrazolylsquarylium compound is too small or becomes reddish when it is too large.

In this connection, when the dipyrazolylmethine compound and dipyrazolylsquarylium compound are contained in a filter for display, the dipyrazolylmethine compound or/and the dipyrazolylsquarylium compound may be mixed with a binder resin together with the diphenylsquarylium compound, or two or more resin layers may be formed by separately mixing them with the binder resin and laminating each binder resin respectively containing the diphenylsquarylium compound, the dipyrazolylmethine compound or/and the dipyrazolylsquarylium compound.

The thus described filter for display of the invention constructed by forming a laminate in which the diphenylsquarylium compound-containing resin layer comprising a binder resin containing the diphenylsquarylium compound, or further containing the dipyrazolylmethine compound or/and the dipyrazolylsquarylium compound, or a single layer sheet or film of the diphenylsquarylium compound-containing resin, on a sheet-shaped or film-shaped transparent base material, may further contain pigments such as an anthraquinone system, an azo system, a phthalocyanine system, a pyrromethene system, a cyanine system, a tetraazaporphyrin system, a squarylium system other than the aforementioned ones, a methine system other than the aforementioned ones and the like, which absorb yellow light, red light, blue light and the like visible lights, in the diphenylsquarylium compound-containing resin, and as their containing mode, they may be coexisted in the diphenylsquarylium compound-containing resin or another layer may be arranged.

It is desirable that the wavelength showing minimum value of transmittance in the light transmittance curve of the filter for display of the invention has a sharp valley type within a wavelength range of from 550 to 610 nm, preferably from 570 to 605 nm, particularly from 580 to 600 nm, wherein the minimum value of transmittance at the wavelength is preferably 30% or less, more preferably 25% or less, and half-value width of said minimum value is preferably 60 nm or less. By this, the green color emission at around 500 to 530 nm and red color emission at a longer wavelength than 600 nm, as emission colors of the fluorescent substance, are not blocked but the neon emission at around 590 nm can be blocked efficiently.

In addition, it is desirable that build up of the long wavelength side is sharp as the shape of the light transmittance curve, that is, when a wavelength showing minimum value of the transmittance within the wavelength range of from 550 to 650 nm is used as a basis, area of the longer wavelength side than that in the light transmittance curve is preferably 50% or less, more preferably 48% or less, particularly 45% or less, based on the total area within the wavelength range of from 550 to 650 nm. Also, it is desirable that it does not have a minimum value other than the minimum value of transmittance at around 590 nm within the wavelength range of from 550 to 650 nm, and even it has one, its transmittance minimum value is preferably 70% or more, more preferably 80% or more, and the visible light transmittance is 40% or more, more preferably 50% or more. By this, brightness of the visual field can be secured.

In addition, when the filter for display of the invention contains the dipyrazolylmethine compound, it is desirable that the wavelength showing minimum value of transmittance other than said wavelength range of from 550 to 610 nm in the light transmittance curve is within the range of from 380 to 420 nm, and its half-value width is preferably 60 nm or less. Also, it is desirable that transmittances at 400 nm and 450 nm are respectively 15% or more and 45% or more. In addition, when it contains the dipyrazolylsquarylium compound, it is desirable that the wavelength showing minimum value of transmittance other than the wavelength range of from 550 to 610 nm in the light transmittance curve is within the wavelength range of from 480 to 520 nm, and that the minimum value is 70% or less. It is desirable also that the half-value width is 60 nm or less. By these settings, regulation of color tone, improvement of color purity, improvement of color temperature and the like can be efficiently achieved by selectively absorbing lights of valleys between violet and blue or/and blue and green without inhibiting fluorescent substance emission of blue or green.

As will be described later, as occasion demands, an infrared ray absorbing layer, an electromagnetic wave blocking layer, a light reflection preventing layer, rough surface preventing (non-glare) layer, a flaw preventing layer and the like are arranged on the filter for display of the invention. In that case, light transmittance is generally reduced as the number of laminating layers increases, but there will be no problem when the visual transmittance is finally controlled at 30% or more, preferably from 35 to 50%.

Also, among the filters for display of the invention, color purity of picture images can be further improved and the color of the filter itself becomes natural gray or natural blue so that commercial value of the device itself when mounted on an electronic display can be increased by the use of a filter having such absorption characteristics that it has one minimum value of transmittance within each of wavelengths of from 580 nm to 600 nm and from 470 nm to 520 nm, the minimum transmittance within a wavelength of from 580 to 600 nm is from 0.01% to 30%, and a light absorption ratio A1 represented by the following formula (1) is from 0.7 to 1.1

$$A1=(100-T1)/(100-T0) \qquad (1)$$

[in the formula (1), T0 is minimum transmittance (%) within a wavelength range of from 580 nm to 600 nm, and T1 is minimum transmittance (%) within a wavelength range of from 470 nm to 520 nm].

More desirable is the one which has the above absorption characteristics and further has an absorption characteristic in that light absorption ratios A2 and A3 represented by the following formula (2) and formula (3) are 0.9 or less, particularly 0.7 or less $$A2=(100-T2)/(100-T1) \qquad (2)$$

$$A3=(100-T3)/(100-T1) \qquad (3)$$

[in the formulae, T1 is minimum transmittance (%) within a wavelength range of from 470 nm to 520 nm, T2 is transmittance (%) at a wavelength 450 nm and T3 is transmittance (%) at a wavelength of 525 nm].

In addition, it is desirable that the filter for display of the invention further contains an antioxidant and an ultraviolet ray absorbent, and as their containing mode, it is desirable to allow the antioxidant to coexist in the diphenylsquarylium compound-containing resin layer, and the ultraviolet ray absorbent may be coexisted in said resin layer but it is desirable to arrange it as an ultraviolet ray absorbent-containing independent layer which can be formed, for example, by preparing a layer having a film thickness of generally from 0.1 to 30 μm, preferably from 0.5 to 10 μm, by a coating method using the same binder resin exemplified regarding the diphenylsquarylium compound-containing resin, or containing it in the transparent base material. In this connection, when the ultraviolet ray absorbent is not coexisted in the diphenylsquarylium compound-containing resin layer, it is desirable that the ultraviolet ray absorbent-containing layer is positioned at an external side than the diphenylsquarylium compound-containing resin layer at the time of using as a filter or contained in a layer positioning at the external side.

Examples of the antioxidant include 2,6-di-t-butyl-p-cresol, 2,6-di-t-butyl-4-hydroxymethylphenol, 2,6-di-t-butyl-4-ethylphenol, 2,4,6-tris-t-butylphenol, n-octadecyl-3-(3',5'-di-t-butyl-4'-hydroxyphenyl)propionate, stearyl-p-(3,5-di-t-butyl-4-hydroxyphenyl)propionate, 2,2'-methylenebis(4-methyl-6-t-butylphenol), 2,2'-methylenebis(4-ethyl-6-t-butylphenol), 4,4'-isopropylidenebisphenol, 4,4'-methylenebis(2,6-di-t-butylphenol), 4,4'-butylidenebis(3-methyl-6-t-butylphenol), 1,1-bis(4'-hydroxyphenol)cyclohexane, 2,6-bis(2'-hydroxy-3'-t-butyl-5'-methylbenzyl)-4-methylphenol, 2,2'-thiobis(4-methyl-6-t-butylphenol), 4,4'-thiobis(2-methyl-6-t-butylphenol), 4,4'-thiobis(3-methyl-6-t-butylphenol), 1,1,3-tris(2'-methyl-4'-hydroxy-5'-t-butylphenyl)butane, 1,3,5-trimethyl-2,4,6-tris(3',5'-di-t-butyl-4'-hydroxybenzyl)benzene, tris(3,5-di-t-butyl-4-hydroxyphenyl)isocyanurate, tris[β-(3,5-di-t-butyl-4-hydroxyphenyl)propionyloxyethyl]isocyanurate, tetrakis[methylene-3-(3',5'-di-t-butyl-4'-hydroxyphenyl)propionate]methane and the like phenol systems; dilauryl thiodipropionate, dimyristyl thiodipropionate, distearyl thiodipropionate and the like sulfur systems; and triphenyl phosphite, diphenylisodecyl phosphite, phenyldiisodecyl phosphite, tris(nonylphenyl) phosphite, tris(mono- and di-nonylphenyl) phosphite, 4,4'-butylidenebis(3-methyl-6-t-butylphenyl)-ditridecyl phosphite, distearylpentaerythritol diphosphite, trilauryl trithiophosphite and the like phosphorus systems, of which a phenol system antioxidant or a phosphorus system antioxidant is desirable. Regarding adding amount of the antioxidant, it is used in an amount of generally from 0.01 to 20 parts by weight, preferably from 0.5 to 10 parts by weight, based on 100 parts by weight of the binder resin. In this connection, when the antioxidant is used in an excess amount, chain oxidation reaction of the squarylium system dye is induced through exposure of the antioxidant to strong light and subsequent oxidation of the antioxidant itself, thus sometimes causing deterioration of light resistance of the squarylium system dye, and in that case, it is desirable to jointly use an ultraviolet ray absorbent.

Examples of the ultraviolet ray absorbent include organic system ultraviolet ray absorbents such as 2-(2'-hydroxy-5'-methylphenyl)benzotriazole, 2-(2'-hydroxy-5'-butylphenyl) benzotriazole, 2-(2'-hydroxy-5'-t-butylphenyl) benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-aminophenyl)benzotriazole, 2-(2'-hydroxy-3'-t-butyl-5'-methylphenyl)-5-chlorobenzotrizole, 2-(2'-hydroxy-3',5'-di-t-butylphenyl)-5-chlorobenzotriazole and the like benzotriazole systems; 2,4-dihydroxybenzophenone, 2-hydroxy-4-methoxybenzophenone, 2-hydroxy-4-octyloxybenzophenone, 2-hydroxy-4-dodecyloxybenzophenone, 2,2'-dihydroxy-4-methoxybenzophenone, 2,2'-dihydroxy-4,4'-dimethoxybenzophenone and the like benzophenone systems; phenyl salicylate, p-t-butylphenyl salicylate, p-octylphenyl salicylate and the like salicylate systems; and hexadecyl-2,5-t-butyl-4-hydroxy benzoate, 2,4-di-t-butylphenyl-3',5'-di-t-butyl-4'-hydroxy benzoate and the like benzoate systems, and inorganic system ultraviolet ray absorbents such as titanium oxide, zinc oxide, cerium oxide, iron oxide, barium sulfate and the like. Among them, those which have a wavelength of preferably from 350 to 420 nm, more preferably from 360 nm to 400 nm, showing 50% transmittance are desirable. A wavelength lower than 350 nm causes weak ultraviolet ray blocking ability and a wavelength higher than 420 nm causes strong coloring, so that these cases are not desirable.

In this connection, instead of arranging the ultraviolet ray absorbent-containing layer, the independent ultraviolet ray absorbent-containing layer can also be formed by laminating it using a commercially available ultraviolet ray cutting filter such as "Sharp Cut Filter SC-38", "SC-39 of the same" or "SC-40 of the same" manufactured by Fuji Photo Film, or "Aquriplen" manufactured by Mitsubishi Rayon.

As occasion further demands and within a range which does not spoil the effect of the invention, the filter for display of the invention may also contain antistatic agents, lubricants, mold releasing agents, flame retardants, flame retardancy assisting agents, fillers and the like various additives generally used in resin moldings by an optional containing mode.

The filter for display of the invention, particularly a filter for plasma display panel, can be provided with a near infrared ray absorbing layer, an electromagnetic wave blocking layer, a light reflection preventing layer, rough surface preventing (non-glare) layer, a flaw preventing layer and the like, and arrangement of each layer in the filter can be optionally selected, but arrangement in this order is desirable. Thickness of each of these layers is generally from 0.1 to 30 μm, preferably from 0.5 to 10 μm.

The near infrared ray absorbing layer is arranged for the purpose of preventing malfunction in the remote control operation and transmission system optical communication by near infrared rays radiated from a plasma display. In this case, the near infrared ray absorbing layer may be formed as an independent layer of a near infrared ray absorbing substance using a binder resin in the same manner as described in the foregoing, but it can also be formed by adding the near infrared ray absorbing substance to any one of an adhesive layer, a flaw preventing layer and the like filter-constituting-layers that will be described later, or an optionally used layer comprising an anchor coat agent, which are used between respective layers of a filter produced as a laminate. The wavelength of near infrared rays to be absorbed is a range of from 800 to 1,000 nm which causes problems particularly in the remote control operation and transmission system optical communication, and an optional near infrared ray absorbing substance can be used with the proviso that it has the absorbance within this range, wherein the near infrared ray transmittance in this range is preferably 15% or less, more preferably 10% or less.

Examples of the near infrared ray absorbing agent include organic substances such as a nitroso system compound and a metal complex thereof, a cyanine system compound, a thiol nickel complex system compound, a dithiol nickel complex system compound, an aminothiol nickel complex system compound, a phthalocyanine system compound, a naphthalocyanine system compound, a tryallylmethane system compound, an imonium system compound, a diimonium system compound, a naphthoquinone system compound, an anthraquinone system compound, an amino compound, an aminium salt system compound, and a squarylium system compound other than the aforementioned ones, a methine system compound other than the aforementioned ones and the like, and inorganic substances such as an antimony dope tin oxide, an indium dope tin oxide, and an oxide, carbide or boride of a metal belonging to the group IV, group V or group VI of the periodic table.

The electromagnetic wave blocking layer is arranged for the purpose of preventing bad influences upon the living body and electronic instrument caused by generated electromagnetic waves accompanied by emission from a display device. The electromagnetic wave blocking layer comprises thin films of silver, copper, indium oxide, zinc oxide, indium tin oxide, antimony tin oxide and the like metals or metal oxides, and they can be produced making use of the vacuum deposition, ion plating, spattering, CVD, plasma chemical deposition or the like conventionally known dry plating method. Though most frequently used as the electromagnetic wave blocking layer is a thin film of indium tin oxide (sometimes abbreviated as ITO), a laminate prepared by superposing a copper thin film or dielectric substance layer having mesh-shaped pores and a metal layer alternately on a base material can also be used suitably. The dielectric substance layer includes indium oxide, zinc oxide and the like transparent metal oxides, and silver or a silver-palladium alloy is general as the metal layer. The laminate is generally laminated into odd numbers of about 3 to 13 layers starting with the dielectric substance layer.

The electromagnetic wave blocking layer may be formed as such on any layer; of the filter for display, or formed by depositing or spattering it on a resin film or glass and then laminating with said filter. Also, it is desirable that the electromagnetic wave blocking layer has a surface inherent resistance value of 5 Ω/□ or less.

The light reflection preventing layer is used for the purpose of preventing picturing of external light such as of a fluorescent lamp on the surface by inhibiting reflection on the surface. The light reflection preventing layer is divided into a case in which it comprises a thin film of an inorganic substance such as silicon oxide, zirconium oxide, titanium oxide, aluminum oxide or the like metal oxide; magnesium fluoride, calcium fluoride or the like metal fluoride; as well as a metal silicate; boride; carbide; nitride; sulfide or the like, and a case in which it comprises a single layer or multiple layer laminate of acrylic resin, fluorine resin and the like resins having different refraction indexes, and in the former case, a method in which it is formed as such on a layer of the filter for display in a single layer or multiple layer mode using the same dry plating method exemplified in relation to the electromagnetic wave blocking layer and a method in which it is formed by depositing or spattering it on a resin film or glass and then laminating with said filter can be exemplified. Also, in the latter case, a conventional resin laminate preparation method such as a method in which a film or sheet of an acrylic resin, fluorine resin or the like resin to be used is adhered to the filter for display using an adhesive can be exemplified. In addition to these methods, a technique for adhering a reflection prevention-treated film onto said filter may also be used. In addition, it is desirable that the light reflection preventing layer has a visual reflectance of 5% or less.

In order to scatter transmitted light for the purpose of widening visual field angle of the filter, the rough surface preventing (non-glare) layer is formed by making fine powder of silica, melamine resin, acrylic resin or the like into an ink, coating it on a layer of the filter of the invention using a surface-coating or the like method, and then carrying out heat curing or photo-curing. Alternatively, a non-glare-treated film may be adhered on said filter.

The flaw preventing layer is formed by coating a coating solution prepared by dissolving or dispersing urethane acrylate, epoxy acrylate, multifunctional acrylate or the like acrylate and a photo-polymerization initiator in an organic solvent on any layer of the filter of the invention, preferably as the outermost layer, by a conventionally known coating method, and then carrying out its drying and photo-curing.

The filter for display of the invention, e.g., a filter for plasma display panel, is preferably a laminate which has the transparent base material and the diphenylsquarylium compound compound-containing resin layer which may contain the dipyrazolylmethine compound or/and the dipyrazolylsquarylium compound as the basic constituting layers; and also has the antioxidant- or/and ultraviolet ray absorbent-containing layer, the near infrared ray absorbing layer, the electromagnetic wave blocking layer, the light reflection preventing layer, the non-glare layer, the flaw preventing layer and the like as occasion demands, and the laminating order of these layers is not particularly limited and the laminating method is not particularly limited too. In general, the laminate is prepared by adhering respective layers using an adhesive, and as occasion demands, carrying out corona discharge treatment, glow discharge treatment, plasma treatment, flame treatment, chemical drug treatment or the like surface treatment and further using an isocyanate system, polyester system, polyethyleneimine system, polybutadiene system, alkyl titanate system or the like known anchor coat agent.

In addition, the filter for display of the invention may be provided with an adhesive layer on the outermost layer for use in laminating said filter on the display representing surface. By this adhesive layer, for example, this filter can be easily adhered on the front side of a display regardless of during production steps of the display or after production of the display.

By doing this way, while it was conventionally necessary to arrange a near infrared absorbing filter, an electromagnetic wave blocking filter and the like in order on the front side of a display itself, it becomes necessary to adhere only the filter of the invention so that not only the production process becomes simple but also the filter and display are integrally formed thus rendering possible thinning of the whole display device.

Examples of the adhesive which constitutes the adhesive layer include styrene butadiene rubber, polyisoprene rubber, polyisobutylene rubber, natural rubber, neoprene rubber, chloroprene rubber, butyl rubber and the like rubbers and polyacrylic acid alkyl esters and the like low polymerization degree resins such as methyl polyacrylate, ethyl polyacrylate, butyl polyacrylate and the like, which may be used alone or may be used by adding pickolite, polybale, rosin ester or the like as an adhesion providing agent.

In this connection, when temperature of the surface of a display itself becomes high, a gas is generated by the heating in some cases, and it becomes necessary to add a gas absorbent or the like in that case. Because of such a reason, it is desirable to use, as a suitable adhesive, an adhesive having such a physical property that it shows a one-eighty degree peeling strength of 300 g/cm or more, preferably 400 g/cm or more, when a 30 $\mu$m polyester film is pasted on a 3 mm glass plate through 30 $\mu$m of the adhesive and then maintained at 80° C. for 10 days.

As the method for forming an adhesive layer, illustratively, the rubbers or low polymerization degree resins are dispersed or dissolved in a single solvent or a mixed solvent system of two or more selected from halogen systems, alcohol systems, ketone systems, ester systems, ether systems, aliphatic hydrocarbon systems or aromatic hydrocarbon systems to adjust the viscosity and coated by dipping, flow coating, spraying, bar coating, gravure coating, roll coating, blade coating, air knife coating or the like known coating method, and then the solvent is dried to obtain an adhesive layer.

Thickness of the adhesive layer in that case is generally from 5 to 100 $\mu$m, preferably from 10 to 50 $\mu$m. It may be useful to protect the adhesive layer until attached to the surface of a plasma display, by arranging a separating film on the surface of the adhesive layer so that dust and the like do not adhere to the adhesive layer.

In that case, working at the time of attachment can be carried out easily when a part having no adhesive layer is formed, or a non-adhesive film is interposed, between the adhesive layer and separating film at an edge region of the filter and used as a separation initiation part.

When air bubbles are present between the surface of a plasma display and the filter at the time of attaching the filter to the plasma display, they cause practically serious problems such as distortion, illegibility and the like of picture images, so that it is necessary to take great care of air bubble trapping.

The filter for display of the invention may be directly attached to the display surface as described in the foregoing, or attached to the display surface by laminating it with transparent glass, a transparent resin plate or the like in advance.

In addition, the display to which said filter is attached includes display devices conventionally known as color picture image display devices effected by a cathode tube, a fluorescent character display tube, a field emission, a plasma panel, a liquid crystal, an electroluminescence and the like, and optional display devices which require color correction by band-pass filters can be used, of which particularly preferred is a conventionally known or commercially available plasma display panel.

The plasma display panel display device is a device which performs display of color picture images based on the following principles. A pair of display electrodes and cells corresponding to respective picture elements (R (red), G (green), B (blue)) arranged between two glass plates are arranged between the front side glass plate and the backside glass plate, xenon gas or neon gas is enclosed in the cells, and, on the other hand, a fluorescent substance corresponding to each picture element is coated on the backside glass plate-side wall in respective cell. An ultraviolet ray is generated by excitation emission of xenon gas or neon gas in the cells due to discharge between the display electrodes. When this ultraviolet ray is irradiated to the fluorescent substance, a visible light corresponding to each picture element is generated. Thus, display of color picture images is carried out by controlling which discharged cell is to be displayed, by arranging an addressing electrode on the backside glass plate and applying a signal to this addressing electrode.

Though the invention has been described in detail using specific embodiments, it is evident for those skilled in the art that various alterations and modifications can be made without departing the purpose and scope of the invention.

In this connection, this application is based on a Japanese patent application filed on Sep. 4, 2000 (Japanese Patent Application 2000-266415), a Japanese patent application filed on Apr. 3, 2001 (Japanese Patent Application 2001-104146) and a Japanese patent application filed on May 9, 2001 (Japanese Patent Application 2001-138101), and entire contents thereof are incorporated herein by reference.

EXAMPLES

The following describes the invention further illustratively by examples, but the invention is not limited to the following examples without overstepping the gist.

Example 1

Together with a mixed solvent of 20 ml of toluene and 20 ml of n-butanol, 0.80 g of 2'-ethylhexanoic acid (3-hydroxyphenyl)amide and 0.18 g of 3,4-dihydroxy-3-cyclobutene-1,2-dione were put into a reaction container equipped with Jean Stark apparatus and allowed to undergo the reaction by heating under reflux for 4 hours, and after completion of the reaction, the reaction mixture was spontaneously cooled and the precipitate was collected by filtration, washed with toluene and then dried to obtain 0.29 g of the reaction product. Since its visible region absorption: $\lambda_{max}$=609 nm (tetrahydrofuran) and mass spectrum MALDI-TOF MS (neg, no marix) method: m/z=547 (M−H), it was confirmed that the thus obtained reaction product is the diphenylsquarylium compound shown in the aforementioned illustrative example (I-3).

Example 2

A 0.35 g portion of a reaction product was obtained by carrying out the same operation of Example 1, except that 2'-ethylhexanoic acid (3,5-dihydroxyphenyl)amide was used instead of 2'-ethylhexanoic acid (3-hydroxyphenyl)amide. Since its visible region absorption: $\lambda_{max}$=603 nm (tetrahydrofuran), molecular extinction coefficient=1.9×10$^5$ (tetrahydrofuran) and mass spectrum MALDI-TOF MS (neg, no marix) method: m/z=579 (M−H), it was confirmed that the thus obtained reaction product is the diphenylsquarylium compound shown in the aforementioned illustrative example (I-9).

Example 3

A 35.2 g portion of a reaction product was obtained by carrying out the same operation of Example 1, except that 62.2 g of ethanesulfonic acid (3,5-dihydroxyphenyl)amide and 15.6 g of 3,4-dihydroxy-3-cyclobutene-1,2-dione were used and a mixed solvent of 150 ml of toluene and 150 ml of n-butanol was used. Since its visible region absorption: $\lambda_{max}$=593 nm (tetrahydrofuran) and molecular extinction coefficient=2.0×10$^5$ (tetrahydrofuran) and based on the $^1$H-NMR results [500 MHz, d$_8$-THF, δ (ppm), 50° C.], it was confirmed that the thus obtained reaction product is a 22:60:18 mixture of the aforementioned illustrative examples (I-34), (I-35) and (I-36).

(I-34)=6.80 (2H, d), 5.98 (2H, d), 3.31–3.20 (4H, m), 1.34–1.29 (6H, m)

(I-35)=6.82 (1H, d), 6.26 (2H, s), 5.99 (1H, d), 3.31–3.20 (4H, m), 1.34–1.29 (6H, m)

(I-36)=6.28 (2H, s), 3.31–3.20 (2H, m), 1.34–1.29 (6H, m)

Example 4

A 0.63% by weight portion of the diphenylsquarylium compound obtained in the aforementioned Example 2, 0.18 g of a dimethoxyethane/toluene mixed solvent (volume ratio 1/1) solution and 1.0 g of 20% by weight dimethoxyethane solution of an acrylic system resin ("Dianal BR-83" mfd. by Mitsubishi Rayon) as a binder resin were mixed, coated on a polyethylene terephthalate film (100 μm in thickness, "PET Film T100E" mfd. by Mitsubishi Chemical Polyester Film) as a transparent base material using a bar coater and then dried to effect formation of a diphenylsquarylium compound-containing resin layer having a film thickness of 6 μm, thereby preparing a filter for plasma display panel use.

Light transmittance of the thus obtained filter for plasma display panel use was measured using a spectrophotometer ("U-3500" mfd, by Hitachi), with the resulting light transmittance curve shown in FIG. 1. The wavelength at the minimum value of transmittance was 604 nm, its half-value width was 48.5 nm, and the transmittance was 17.92%. Also, when a wavelength of 604 nm showing minimum value of the transmittance within the wavelength range of from 550 to 650 nm was used as a basis, area of the longer wavelength side than that in the light transmittance curve-was 39.6% based on the total area within the wavelength range of from 550 to 650 nm, and the shape of the longer wavelength side was a sharp shape having a small degree of red color emission inhibition. Also, there was no minimum value other than the minimum value of 604 nm, the visible light transmittance was 68.95%, and the lightness L* and color coordinates a* and b* in the L*a*b* system of color representation defined by JIS Z8729 were L*=86.55, a*=−9.22 and b*=−20.25 under 2° visual field and C light source, thus confirming that this filter shows small inhibition of emission of the three primary colors red, blue and green of the plasma display panel, does not reduce lightness of the visual field and is excellent in blocking the neon emission.

In addition, when this filter was allowed to stand for 100 hours in a constant temperature bath of 100° C. and then residual ratio of the diphenylsquarylium compound was calculated by measuring its absorbance using a spectrophotometer ("U-3500" mfd, by Hitachi), it was 100% which confirmed that this filter is excellent in heat resistance.

Example 5

A filter for plasma display panel use was prepared in the same manner as in Example 4, except that 0.13 g of a 0.63% by weight dimethoxyethane solution of the diphenylsquarylium compound mixture obtained in the aforementioned Example 3 was used instead of 0.18 g of a 0.63% by weight dimethoxyethane/toluene mixed solvent (volume ratio 1/1) solution of the diphenylsquarylium compound obtained in the aforementioned Example 2, and 4.0 mg of an antioxidant ("Adekastub AO-330" mfd. by ASAHI DENKA KOGYO) was further added.

Figure 2:
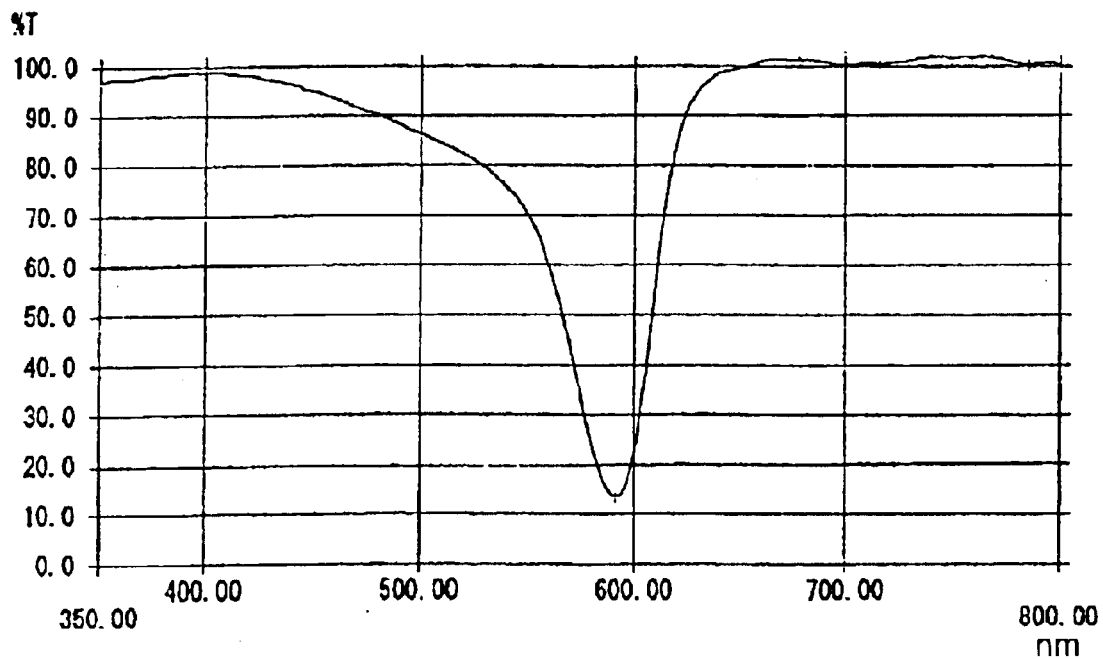
FIG. 2 is a light transmittance curve of the filter for plasma display panel use obtained in Example 5 of the invention.

Light transmittance of the thus obtained filter for plasma display panel use was measured in the same manner as in Example 4, with the resulting light transmittance curve shown in FIG. 2. The wavelength at the minimum value of transmittance was 591 nm, its half-value width was 49.4 nm, and the transmittance was 13.68%. Also, when a wavelength of 591 nm showing minimum value of the transmittance within the wavelength range of from 550 to 650 nm was used as a basis, area of the longer wavelength side than that in the light transmittance curve was 44.1% based on the total area within the wavelength range of from 550 to 650 nm, and the shape of the longer wavelength side was a sharp shape having a small degree of red color emission inhibition. Also, there was no minimum value other than the minimum value of 591 nm, the visible light transmittance was 62.98%, and the lightness L* and color coordinates a* and b* in the L*a*b* system of color representation defined by JIS Z8729 were L*=83.34, a*=1.38 and b*=−24.91 under 2° visual field and C light source, thus confirming that this filter shows small inhibition of emission of the three primary colors red, blue and green of the plasma display panel, does not reduce lightness of the visual field and is excellent in blocking the neon emission. In addition, when this filter was subjected to the heat resistance test in the same manner as in Example 4 and residual ratio of the diphenylsquarylium compound was calculated, it was 100% which confirmed that this filter is excellent in heat resistance.

Example 6

A filter for plasma display panel use was prepared in the same manner as in Example 4, except that 0.15 g of a solution prepared by dissolving 6.3 mg of the dipyrazolylmethine compound of the aforementioned illustrative example (II-8) and 3.1 mg of the dipyrazolylsquarylium compound of the aforementioned illustrative example (III-3) in 1.60 g of a dimethoxyethane/toluene mixed solvent (volume ratio 3/1) was further added.

Figure 3:
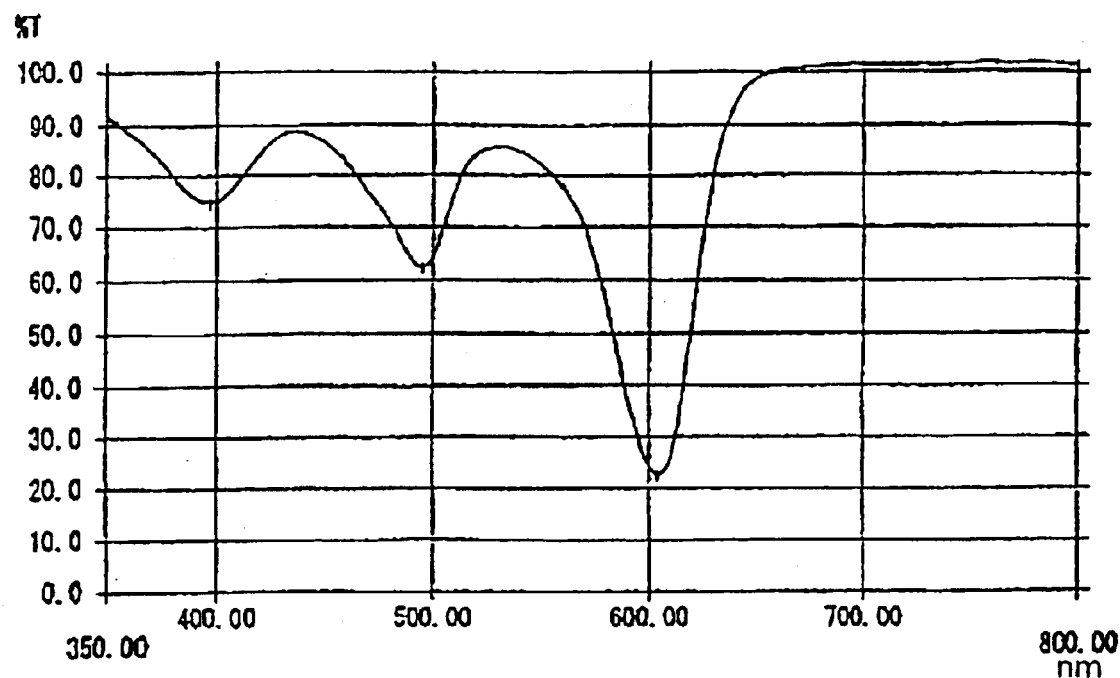
FIG. 3 is a light transmittance curve of the filter for plasma display panel use obtained in Example 6 of the invention.

Light transmittance of the thus obtained filter for plasma display panel use was measured in the same manner as in Example 4, with the resulting light transmittance curve shown in FIG. 3. The wavelengths at the minimum values of transmittance was 604 nm, 495 nm an 397 nm and the transmittances at respective wavelengths were 22.56%, 62.60% and 74.73%. Also, the visible light transmittance was 67.68%, and the lightness L* and color coordinates a* and b* in the L*a*b* system of color representation defined by JIS Z8729 were L*=85.59, a*=−10.19 and b*=−10.86 under 2° visual field and C light source, thus confirming that this filter shows small inhibition of emission of the three primary colors red, blue and green of the plasma display panel, does not reduce lightness of the visual field, is excellent in blocking the neon emission and is also excellent in color purity with controlled color tone.

Example 7

A filter for plasma display panel use was prepared in the same manner as in Example 4, except that 0.13 g of a 0.63% by weight dimethoxyethane solution of the diphenylsquarylium compound mixture obtained in the aforementioned Example 3 was used instead of 0.18 g of a 0.63% by weight dimethoxyethane/toluene mixed solvent (volume ratio 1/1) solution of the diphenylsquarylium compound obtained in the aforementioned Example 2, and that 0.15 g of a solution prepared by dissolving 6.6 mg of the dipyrazolylmethine compound of the aforementioned illustrative example (II-3) and 3.6 mg of the dipyrazolylsquarylium compound of the aforementioned illustrative example (III-3) in 1.60 g of a dimethoxyethane/toluene mixed solvent (volume ratio 3/1) was further added.

Figure 4:
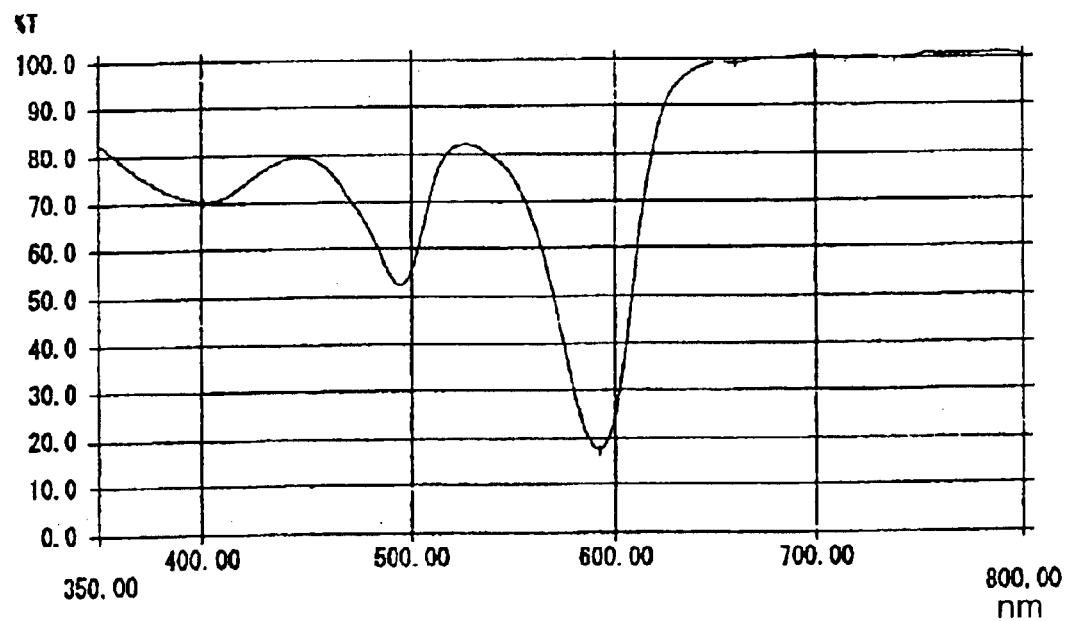
FIG. 4 is a light transmittance curve of the filter for plasma display panel use obtained in Example 7 of the invention.

Light transmittance of the thus obtained filter for plasma display panel use was measured in the same manner as in Example 4, with the resulting light transmittance curve shown in FIG. 4. The wavelengths at the minimum values of transmittance were 592 nm, 495 nm and 401 nm, and the transmittances at respective wavelengths were 17.24%, 52.44% and 70.34%. Also, the visible light transmittance was 62.39%, and the lightness L* and color coordinates a* and b* in the L*a*b* system of color representation defined by JIS Z8729 were L*=83.01, a*=−1.83 and b* −10.53 under 2° visual field and C light source, thus confirming that this filter shows small inhibition of emission of the three primary colors red, blue and green of the plasma display panel, does not reduce lightness of the visual field, is excellent in blocking the neon emission and is also excellent in color purity with controlled color tone.

Example 8

A 0.36 g portion of 0.63% by weight cyclohexanone solution of 2-(2'-hydroxy-3',5'-di-t-butylphenyl) benzotriazole as an ultraviolet ray absorbent and 3 g of 20% by weight cyclohexanone solution of a polyethylene terephthalate resin ("Bylon 200" mfd. by TOYOBO) as a binder resin were mixed, coated on a polyethylene terephthalate film opposite side of the diphenylsquarylium compound-containing resin layer of the filter for plasma display panel use obtained in the aforementioned Example 4, and then dried to effect formation of an ultraviolet ray absorbing layer of 6 μm in film thickness.

The thus obtained filter for plasma display panel use having the ultraviolet ray absorbing layer was subjected to 80 hours of exposure treatment using the ultraviolet ray absorbing layer as the exposing face, in a xenon fade meter ("FAL-25AX-HC.B.EC" mfd. by Suga Shiken-ki) under conditions of 73,000 luxes in illuminance, 63° C. in black panel temperature and 33% in relative humidity, and then its absorbance was measured using the same spectrophotometer described in the foregoing and residual ratio of the diphenylsquarylium compound was calculated from the value to find that the ratio was 86.9% which confirmed that the filter is excellent in light resistance.

Example 9

A filter for plasma display panel use was prepared in the same manner as in Example 8 by forming an ultraviolet ray absorbing layer on the opposite side of the diphenylsquarylium compound-containing resin layer of the filter for plasma display panel use obtained in the aforementioned Example 5.

When light resistance test of the thus obtained filter for plasma display panel use having the ultraviolet ray absorbing layer was carried out in the same manner as in Example 8 and residual ratio of the diphenylsquarylium compound was calculated, it was 85.7% which confirmed that the filter is excellent in light resistance.

Example 10

A filter for plasma display panel use was prepared in the same manner as in Example 4, except that 0.13 g of 0.63% by weight dimethoxyethane solution of the diphenylsquarylium compound obtained in the aforementioned Example 3 was used instead of 0.18 g of 0.63% by weight dimethoxyethane/toluene mixed solvent (volume ratio 1/1) solution of the diphenylsquarylium compound obtained in the aforementioned Example 2, and "Dianal BR-80" mfd. by Mitsubishi Rayon was used instead of "Dianal BR-83" mfd. by Mitsubishi Rayon, as an acrylic resin of the binder resin, and an ultraviolet ray absorbing layer was formed on a polyethylene terephthalate film of the opposite side of the diphenylsquarylium compound-containing resin layer of this filter in the in the same manner as in Example 8.

When light resistance test of the thus obtained filter for plasma display panel use having the ultraviolet ray absorbing layer was carried out in the same manner as in Example 8 and residual ratio of the diphenylsquarylium compound was calculated, it was 91.5% which confirmed that the filter is excellent in light resistance.

Example 11

A 30 wt % toluene solution of a polymethyl methacrylate resin ("Dianal BR-80" mfd. by Mitsubishi Rayon), 0.323 wt %/resin content of the diphenylsquarylium compound obtained in Example 3, 0.098 wt %/resin content of the compound of the aforementioned illustrative example (III-3) (a pyrazole system squarylium compound), DME and toluene were mixed and dissolved to the resin content of 15 wt % and a final solvent ratio (DME/toluene) of 3/7, coated on a polyethylene terephthalate film (a PET film "T 600E" mfd. by Mitsubishi Chemical Polyester Film, 50 μm in thickness) using NO.: 20 bar coater (mfd. by Tayu Kizai) and then dried to obtain a filter having a coating film of 4.5 μm in film thickness. This is called filter A.

A 30 wt % toluene solution of a polymethyl methacrylate resin ("Dianal BR-80" mfd. by Mitsubishi Rayon), 7.6 wt %/resin content of a diimonium system near infrared absorbing pigment (antimony hexafluoride salt of N,N,N',N'-tetrakis(p-dibutylaminophenyl)-p-phenylenediimonium), toluene and methyl ethyl ketone were mixed and dissolved to the resin content of 10 wt % and a final solvent ratio (toluene/methyl ethyl ketone) of 1/1, coated on a polyethylene terephthalate film (a PET film "T 600E" mfd. by Mitsubishi Chemical Polyester Film, 50 μm in thickness) using NO. 20 bar coater (mfd. by Tayu Kizai) and then dried to obtain a filter having a coating film. A 30 wt % toluene solution of a polymethyl methacrylate resin ("Dianal BR-80" mfd. by Mitsubishi Rayon), 9.2 wt %/resin content of a dithiol nickel complex near infrared ray absorbing pigment (bis-2,2'-[1,2-di(3-chlorophenyl)ethylenediimine]benzenethiolate)nickel(II), toluene and tetrahydrofuran were mixed and dissolved to the resin content of 10 wt % and a final solvent ratio (toluene/tetrahydrofuran) of 7/3 and coated on the backside of this film in the same manner to obtain a filter B.

A filter for plasma display panel use was obtained by superposing and pasting an electromagnetic wave shielding mesh (line width 10 μm, line pitch 250 μm), the aforementioned filter B and the aforementioned filter A in that order on a glass plate, and further pasting an anti-reflection film (Realook 1200, mfd. by NIPPON OIL & FATS) on the opposite side of the glass plate using an adhesive to which a UV absorbent had been added.

Visual transmittance, color tone, color temperature and red color improving ratio of this filter were evaluated by the following evaluation methods.

Results of respective evaluations and values of A1, A2 and A3 represented by the formulae (1), (2) and (3) are shown in Table 1.

1. Visual Transmittance:

Using spectral transmission factor of the filter measured by a Shimadzu spectrophotometer UV3100PC and visible light emission of PDP as an illuminant, Y of tri-stimulus values of the XYZ system of color representation was calculated and used as the visual transmittance. The calculation method is based on JIS Z8722.

This visual transmittance is preferably 30% or more, more preferably from 35 to 50%.

2. Color Tone:

Using spectral transmission factor of the filter measured by a Shimadzu spectrophotometer UV3100PC, color tones a* and b* of the filter were calculated. The calculation method is based on JIS Z8729.

When the values of a* and b* are a*=−6.0 to +6.0 and b*=−6 to 0, respectively, color tone of the filter becomes natural color which is more desirable.

3. Color Temperature:

Color temperature after arrangement of the filter on the front side of a plasma display (PDS4221J) manufactured by FUJITSU GENERAL was measured by a spectral luminance meter manufactured by MINOLTA CAMERA, and its difference from the color temperature of the plasma display without filter was shown.

It is desirable that difference in the color temperature is large which is preferably +500 K or more, more preferably +1,000 or more.

4. Red Color Improving Ratio

Using a chromaticity as the origin when a plasma display (PDS4221J) manufactured by FUJITSU GENERAL without arranging the filter on its front side displayed red color, the degree of closing the chromaticity of red color to the NTSC standard red when the filter was arranged on the front side was shown by percentage.

It is desirable that the red color improving ratio is 50% or more, preferably 70% or more, because the color purity of red is improved to more red-like color thereby. In this connection, the uv system of color representation (CIE 1960 UCS chromaticity diagram) was solely used in the evaluation.

Example 12

A filter for plasma display panel use was obtained in the same manner as in Example 11, except that adding amount of the compound of the aforementioned illustrative example (III-3) (a pyrazole system squarylium compound) was changed to 0.195 wt %/resin content.

Values of the evaluation results and the like of the filter obtained in the same manner as in Example 11 are shown in Table 1.

Example 13

A filter for plasma display panel use was obtained in the same manner as in Example 11, except that the compound of the aforementioned illustrative example (III-4) (a pyrazole system squarylium compound) was used instead of the compound of the aforementioned illustrative example (III-3) (a pyrazole system squarylium compound), its adding amount was changed to 0.325 wt %/resin content and adding amount of yellow L3G (mfd. by Mitsubishi Chemical) was changed to 0.118 wt %/resin content.

Values of the evaluation results and the like of the filter obtained in the same manner as in Example 11 are shown in Table 1.

Example 14

A filter for plasma display panel use was obtained in the same manner as in Example 11, except that adding amount of the compound of the aforementioned illustrative example (III-3) (a pyrazole system squarylium compound) was changed to 0.663 wt %/resin content.

Values of the evaluation results and the like of the filter obtained in the same manner as in Example 11 are shown in Table 1.

Example 15

A filter for plasma display panel use was obtained in the same manner as in Example 11, except that the compound of the aforementioned illustrative example (III-4) (a pyrazole system squarylium compound) was used instead of the compound of the aforementioned illustrative example (III-3) (a pyrazole system squarylium compound), its adding amount was changed to 0.1 wt %/resin content and adding amount of yellow L3G (mfd. by Mitsubishi Chemical) was changed to 0.65 wt %/resin content.

Values of the evaluation results and the like of the filter obtained in the same manner as in Example 11 are shown in Table 1.

Example 16

A filter for plasma display panel use was obtained in the same manner as in Example 11, except that adding amount of the compound of the aforementioned illustrative example (III-3) (a pyrazole system squarylium compound) was changed to 0.027 wt %/resin content.

Values of the evaluation results and the like of the filter obtained in the same manner as in Example 11 are shown in Table 1.

TABLE 1

| | Visual trans- mittance | Color tone ($a^*, b^*$) | Color temp. (to light source) | Red color improving ratio | A1 | A2 | A3 |
|---|---|---|---|---|---|---|---|
| Ex. 11 | 46% | $a^* = -2.4$ $b^* = -5.0$ | +1600 K | 63% | 0.7 | 0.8 | 0.8 |
| Ex. 12 | 45% | $a^* = -0.9$ $b^* = -3.0$ | +1000 K | 64% | 0.9 | 0.8 | 0.7 |
| Ex. 13 | 43% | $a^* = 4.9$ $b^* = -2.9$ | +400 K | 66% | 1.0 | 0.7 | 0.7 |
| Ex. 14 | 42% | $a^* = 3.6$ $b^* = 5.6$ | −1000 K | 67% | 1.2 | 0.7 | 0.6 |
| Ex. 15 | 46% | $a^* = -5.4$ $b^* = 2.3$ | +300 K | 64% | 0.8 | 1.0 | 0.9 |
| Ex. 16 | 47% | $a^* = -3.7$ $b^* = -6.4$ | +2100 K | 63% | 0.6 | 0.9 | 0.9 |

Industrial Applicability

The invention can provide a diphenylsquarylium compound which has a sharp minimum value within the wavelength range of from 550 to 610 nm in the light transmittance curve and from which a filter causing no reduction of brightness of the visual field and having excellent heat resistance and light resistance can be obtained when used by containing in a filter for display, and a filter for display which contains this diphenylsquarylium compound.

What is claimed is:

1. A diphenylsquarylium compound characterized in that it is represented by the following general formula (I)

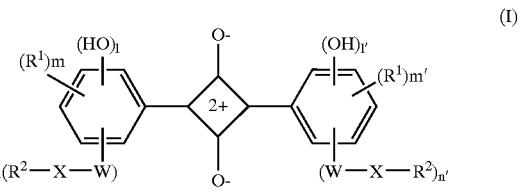

[in the formula (I), $R^1$ represents an alkyl group which may have substituent(s), an alkoxy group which may have substituent(s), a cycloalkyl group which may have substituent(s), an aryl group which may have substituent(s), an aryloxy group which may have substituent(s), or a halogen atom, W in W—X—$R^2$ represents imino group, an alkylimino group or oxygen atom, X represents carbonyl group or sulfonyl group, $R^2$ represents a monovalent group or hydrogen atom, l and l' are each independently an integer of from 0 to 4, m and m' are each independently an integer of from 0 to 4, n and n' are each independently an integer of from 1 to 5, wherein l+m+n≦5 and l'+m'+n'≦5, and when two or more of $R^1$ and W—X—$R^2$ are respectively present on the benzene rings, the respective $R^1$ and W—X—$R^2$ may be different from one another on one benzene ring or both benzene rings].

2. The diphenylsquarylium compound described in claim 1, wherein any one of the groups selected from the class consisting of hydroxyl group, $R^1$ and W—X—$R^2$ is bonded to at least both o-positions of the two phenyl groups of the general formula (I).

3. The diphenylsquarylium compound described in claim 1 or 2, wherein $R^2$ in the general formula (I) is any one of the groups selected from the class consisting of (1) an alkyl group which may have an alkoxy group, cycloalkyl group, aryl group or halogen atom as substituent(s), (2) an alkoxy group, (3) a cycloalkyl group which may have an alkyl group as substituent(s), (4) an aryl group which may have an alkyl group, alkoxy group or halogen atom as substituent(s), (5) an aryloxy group which may have an alkyl group, alkoxy group or halogen atom as substituent(s), (6) amino group which may have an alkyl group as substituent(s) and (7) a heterocyclic group.

4. The diphenylsquarylium compound described in claim 1, wherein W in W—X—$R^1$ in the general formula (I) is imino group and X therein is sulfonyl group.

5. A filter for display characterized in that it contains the diphenylsquarylium compound described in claim 1.

6. The filter for display described in claim 5, wherein the display is a plasma display panel.

7. The filter for display described in claim 5 or 6, wherein it further contains a dipyrazolylmethine compound represented by the following general formula (II) or/and a dipyrazolylsquarylium compound represented by the following general formula (III)

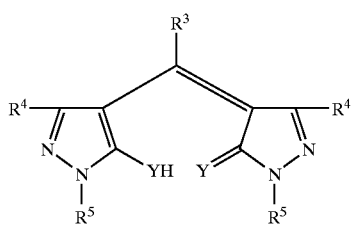

(II)

[in the formula (II), $R^3$ represents an alkyl group which may have substituent(s), a cycloalkyl group which may have substituent(s), an aryl group which may have substituent(s), or a hydrogen atom, $R^4$ represents an alkyl group which may have substituent(s), an alkoxy group which may have substituent(s), an alkoxycarbonyl group which may have substituent(s), a cycloalkyl group which may have substituent(s), an aryl group which may have substituent(s), an aryloxy group which may have substituent(s), an aryloxycarbonyl group which may have substituent(s), amino group which may have substituent(s), or hydrogen atom, $R^5$ represents an alkyl group which may have substituent(s), a cycloalkyl group which may have substituent(s), an aryl group which may have substituent(s), or hydrogen atom, and Y represents oxygen atom or imino group, wherein these $R^4$, $R^5$ and Y may be different from one another between both pyrazole rings], and

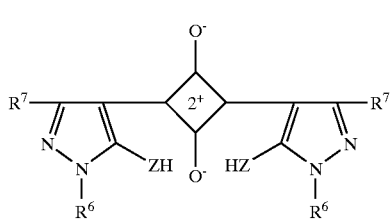

(III)

[in the formula (III), $R^6$ represents an alkyl group which may have substituent(s), a cycloalkyl group which may have substituent(s), an aryl group which may have substituent(s), or hydrogen atom, $R^7$ represents an alkyl group which may have substituent(s), an alkoxy group which may have substituent(s), an alkoxycarbonyl group which may have substituent(s), a cycloalkyl group which may have substituent(s), an aryl group which may have substituent(s), an aryloxy group which may have substituent(s), an aryloxycarbonyl group which may have substituent(s), amino group which may have substituent(s), or hydrogen atom, and Z represents oxygen atom or imino group, wherein these $R^6$, $R^7$ and Z may be different from one another between both pyrazole rings].

8. The filter for display described in claim 5, wherein it has one minimum value of transmittance within each of wavelengths of from 580 nm to 600 nm and from 470 nm to 520 nm, the minimum transmittance within a wavelength of from 580 to 600 nm is from 0.01% to 30%, and a light absorption ratio A1 represented by the following formula (1) is from 0.7 to 1.1

$$A1=(100-T1)/(100-T0) \quad (1)$$

[in the formula (I), T0 is minimum transmittance (%) within a wavelength range of from 580 nm to 600 nm, and T1 is minimum transmittance (%) within a wavelength range of from 470 to 520 nm].

9. The filter for display described in claim 5, wherein it has one minimum value of transmittance within each of wavelengths of from 580 nm to 600 nm and from 470 nm to 520 nm, the minimum transmittance within a wavelength of from 580 to 600 nm is from 0.01% to 30%, and a light absorption ratio A1 represented by the following formula (1) is from 0.7 to 1.1 and light absorption ratios A2 and A3 represented by the following formula (2) and formula (3) are 0.9 or less $$A1-(100-T1)/(100-T0) \quad (1)$$

$$A2-(100-T2)/(100-T1) \quad (2)$$

$$A3-(100-T3)/(100-T1) \quad (3)$$

[in the above formulae, T0 is minimum transmittance (%) within a wavelength range of from 580 nm to 600 nm, T1 is minimum transmittance (%) within a wavelength range of from 470 nm to 520 nm, T2 is transmittance (%) at a wavelength of 450 nm and T3 is transmittance (%) at a wavelength of 525 nm].

* * * * *